US011885629B2

(12) United States Patent
Duffy et al.

(10) Patent No.: US 11,885,629 B2
(45) Date of Patent: Jan. 30, 2024

(54) PERSONALIZED EXPERIENCE JOURNEYS

(71) Applicant: PANASONIC INTELLECTUAL PROPERTY MANAGEMENT CO., LTD., Osaka (JP)

(72) Inventors: David Michael Duffy, Zurich (CH); Matthew John Lawrenson, Chesterfield, MO (US); Jan Jasper van den Berg, London (GB); Kenji Sugihara, Tokyo (JP); Sadako Yamagata, Kanagawa (JP); Akihisa Kawasaki, Kanagawa (JP); Koichi Nakahara, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 416 days.

(21) Appl. No.: 17/201,134

(22) Filed: Mar. 15, 2021

(65) Prior Publication Data
US 2021/0199455 A1    Jul. 1, 2021

Related U.S. Application Data

(63) Continuation of application No. PCT/JP2019/037397, filed on Sep. 24, 2019.
(Continued)

(51) Int. Cl.
*G01C 21/34* (2006.01)
*G06Q 50/00* (2012.01)

(52) U.S. Cl.
CPC ..... *G01C 21/3476* (2013.01); *G01C 21/3484* (2013.01); *G06Q 50/01* (2013.01)

(58) Field of Classification Search
CPC . G06Q 50/01; G01C 21/3476; G01C 21/3484
(Continued)

(56) References Cited

U.S. PATENT DOCUMENTS 9,623,905 B2 * 4/2017 Shashua .............. G06V 20/584
9,651,391 B1 * 5/2017 Hayes ................ G01C 21/3438
(Continued)

FOREIGN PATENT DOCUMENTS

EP         3985640 A1 *  4/2022  .......... B60W 30/095
JP      2001-357309       12/2001
(Continued)

OTHER PUBLICATIONS

International Search Report (ISR) from International Searching Authority (European Patent Office) in International Pat. Appl. No. PCT/JP2019/037397, dated Nov. 29, 2019.
(Continued)

*Primary Examiner* — Atul Trivedi
(74) *Attorney, Agent, or Firm* — Greenblum & Bernstein, P.L.C.

(57) ABSTRACT

A system, method and computer-readable medium for generating and transmitting experience journeys. The system includes a processor and a memory including instructions that, when executed by the processor, cause the processor to perform operations including: receiving a user's request for an experience journey; retrieving a listing of activities within a prescribed vicinity of the user; retrieving a listing of the user's preferences; eliminating activities from the listing of activities that are contrary to the preferences in the listing of user preferences, thereby forming a listing of preferred available activities; devising routes from the user's location to the activities in the listing of preferred available activities; generating experience journeys from the listing of preferred available activities and the devised routes to the
(Continued)

activities in the listing of preferred available activities; and transmitting the generated experience journeys to the user.

19 Claims, 14 Drawing Sheets

Related U.S. Application Data

(60) Provisional application No. 62/735,297, filed on Sep. 24, 2018.

(58) Field of Classification Search
USPC .......................................................... 701/426
See application file for complete search history.

(56) References Cited

U.S. PATENT DOCUMENTS

| | | | |
|---|---|---|---|
| 9,665,101 B1* | 5/2017 | Templeton | B60W 50/14 |
| 10,032,368 B1* | 7/2018 | Thompson | G06Q 30/0284 |
| 2002/0147619 A1 | 10/2002 | Floss et al. | |
| 2009/0077057 A1 | 3/2009 | Ducheneaut et al. | |
| 2013/0024203 A1 | 1/2013 | Flores et al. | |
| 2014/0244110 A1* | 8/2014 | Tharaldson | G06Q 30/0261 |
| | | | 701/99 |
| 2015/0106285 A1 | 4/2015 | Chu et al. | |
| 2016/0320195 A1* | 11/2016 | Liu | G01C 21/3438 |
| 2016/0321566 A1* | 11/2016 | Liu | G05D 1/0011 |
| 2016/0364812 A1* | 12/2016 | Cao | G06Q 50/30 |
| 2017/0180961 A1* | 6/2017 | Gauglitz | G06Q 30/06 |
| 2018/0216946 A1* | 8/2018 | Gueye | G01C 21/3617 |
| 2018/0264347 A1* | 9/2018 | Tran | A63B 69/38 |
| 2018/0356237 A1* | 12/2018 | Abramson | G01C 21/3626 |
| 2021/0132612 A1* | 5/2021 | Wang | G08G 1/0125 |

FOREIGN PATENT DOCUMENTS

| | | |
|---|---|---|
| JP | 2002-269444 | 9/2002 |
| JP | 2005-032017 | 2/2005 |
| JP | 2006-286018 | 10/2006 |
| JP | 2009-076039 | 4/2009 |
| JP | 2011-060059 | 3/2011 |
| JP | 2011-175603 | 9/2011 |
| JP | 2012-203501 | 10/2012 |
| JP | 2016-122324 | 7/2016 |

OTHER PUBLICATIONS

Written Opinion (WO) from International Searching Authority (European Patent Office) in International Pat. Appl. No. PCT/JP2019/037397, dated Nov. 29, 2019.

Gavalas et al., "A survey on mobile tourism Recommender Systems", 2013 Third International Conference on Communications and Information Technology (ICCIT), pp. 131-135 (Jun. 19, 2013).

Yu et al., "Personalized Location-Based Recommendation Services for Tour Planning in Mobile Tourism Applications", International Conference on Financial Cryptography and Data Security; Springer, Berlin, Heidelberg, pp. 38-49 (Sep. 1, 2009).

Koo et al., "Special section on generative smart tourism systems and management: Man-machine interaction", International Journal of Information Management, Elsevier Science Ltd, GB, vol. 36, No. 6, pp. 1301-1305 (May 31, 2016).

Office Action from Japan Patent Office (JPO) in Japanese Patent Appl. No. 2021-500755, dated Jan. 31, 2023, together with an English language translation.

\* cited by examiner

PERSONALIZED EXPERIENCE JOURNEYS

CROSS-REFERENCE TO RELATED APPLICATIONS

This application is a continuation of PCT International Patent Application No. PCT/JP2019/037397 filed on Sep. 24, 2019, which claims the benefit of priority of U.S. Provisional Patent Application No. 62/735,297 filed on Sep. 24, 2018, the entire contents of which are incorporated herein by reference.

FIELD

Embodiments are directed to a machine learning system offering experiential commerce through mobility services.

BACKGROUND

Experiential commerce, which is the offering of interactive experiences to customers alongside or instead of product offerings, is becoming increasingly profitable due in part to social media. Consumers are placing increased value on consumption of experiences, which can be easily shared on social media, rather than on the purchase of products, because these shared experiences can be perceived to have longer lasting value.

Businesses that have traditionally offered products are increasingly using experiential offerings to increase consumer draw. Experiential offerings, which can be sold to consumers directly from businesses, can also play a role in online and real world advertising and marketing campaigns, as they provide an engaging method to reach new customers.

Businesses operating in the sharing economy, such as Airbnb (registered trademark), are also increasingly offering experiences as part of their service offering, as they are ideally situated to capitalize on 'add-on' sales of experiences with their primary service offerings.

Moreover, content services such as Netflix (registered trademark) and Spotify (registered trademark) utilize machine learning techniques to automatically gauge the user's preferences and suggest content to them that is unexpected but likely to be enjoyed. Through adjustments in their recommendations algorithms, these content services can increase exposure of certain content to customers and decrease exposure of other content, thereby providing more control over what content they provide to their consumers.

Facebook has likewise been able to successfully profile its users based on their clicked "Reactions" to content that they see. The combination of simple metrics for "like", "love", "anger" etc. can be used to gain deep insights into the preferences of users.

Various computer vision techniques are known that can be used to determine the activities occurring in a scene. These techniques can be correlated with other data sources (such as user tracking via mobile devices) to gather real-time information about an event. Computer vision techniques can also be used to observe a user's body language and/or facial expressions captured on video, which compiles data for analysis as to how the user is responding to objects, people and/or events they come across.

SUMMARY

The present disclosure, through one or more of its various aspects, embodiments, and/or specific features or sub-components, provides, inter alia, various systems, servers, devices, methods, media, programs, and platforms for providing mobility service capitalization on experiential commerce. The various aspects, embodiments, features, and/or sub-components provide increased data for enhancing recommendations to users in the mobility context. The various aspects, embodiments, features, and/or sub-components provide additional experiential value and interest to journeys having explicit boundaries, e.g., journey length, start/finish location, etc. Accordingly, by the present disclosure, optimized processes provide a service which generates for users personalized experience journeys, which can include various activities in which user can engage and the routing between them.

In the various aspects, embodiments, and/or specific features or sub-components, user's preferences are learned by processing data gathered from the user's interaction with activities and can learn about activities by processing data gathered from sources relevant to the activities. In furtherance of these various aspects, embodiments, and/or specific features or sub-components, activities can be suggested to the user that are within the user's preferences and are located within a prescribed range of the generated journey.

Moreover, various aspects, embodiments, and/or specific features or sub-components can monitor and process data from data feeds present in a smart city in order to learn current or future status of activities, such as, e.g., whether the activity is present or not present, whether the activity is open or closed, how busy is the activity, etc. Further, various aspects, embodiments, and/or specific features or sub-components can monitor and process data from data feeds in a smart city in order to learn user preferences, such as, e.g., what type of activities are enjoyed and/or not enjoyed by the user. In the various aspects, embodiments, and/or specific features or sub-components experience journey plans can be generated based on the user's preferences, the current status of activities, and user-input data such as, e.g., start and finish location.

Further, embodiments can be advantageously directed to a system for the automatic and dynamic detection and categorization of user preferences from smart city data feeds. Embodiments can also be advantageously directed to a system for the automatic and dynamic detection of the status of activities present within a smart city.

In other embodiments, the disclosed system can advantageously be directed the automatic generation of experience journey plans based on the user's preferences and the status of activities. The disclosed system can also be advantageously directed to the automatic generation of content to present to the user so that user preference data can be gained from the user's response to this content.

Embodiments are directed to a system for generating and transmitting experience journeys. The system includes a processor and a memory including instructions that, when executed by the processor, cause the processor to perform operations including: receiving a user's request for an experience journey; retrieving a listing of activities within a prescribed vicinity of the user; retrieving a listing of the user's preferences; eliminating activities from the listing of activities that are contrary to the preferences in the listing of user preferences, thereby forming a listing of preferred available activities; devising routes from the user's location to the activities in the listing of preferred available activities; generating experience journeys from the listing of preferred available activities and the devised routes to the activities in the listing of preferred available activities; and transmitting the generated experience journeys to the user.

According to embodiments, the user's request can include journey parameters that include at least one of desired departure and arrival times, starting and ending locations, or acceptable ranges for deviation.

In accordance with embodiments, the listing of user's preferences may be retrieved from a database of preferences. User's preference can be stored in the database of preferences as binary ratings. Further, user's preferences can be stored in the database of preferences as a function involving several variables. The database of preferences may be populated by at least one of processed smart city feeds or social media. Also, the smart city feeds can include street cameras, traffic sensors and footfall sensors. Data from the street cameras and traffic sensors may be processed by computer vision techniques, data from the footfall sensors is processed by numerical counts, and data from social media feeds are text processed.

In embodiments, the listing of activities may be retrieved from a database of activities. The database of activities can be populated by processed smart city feeds and social media. Further, the smart city feeds can include street cameras, traffic sensors and footfall sensors. Data from the street cameras and traffic sensors may be processed by computer vision techniques, data from the footfall sensors is processed by numerical counts, and data from social media feeds are text processed. Further, the database of activities can include activity statuses. The activity statuses may include metrics that are binary in nature.

According to embodiments, the generated experience journeys can be ranked. Metrics on which the generated experience journeys are ranked may include at least one of: likely enjoyment of the journey, how well the journey fits the user's input journey parameters, or how much displacement from desired arrival position would result from taking journey.

In accordance with still yet other embodiments, the memory can include further instructions that, when executed by the processor, cause the processor to perform operations including: generating cues, which include content related to activities not associated with a preference in the listing of the user's preferences, for the user's review; monitoring the user's reaction to the cues; and storing the user's preference to the activity based upon the monitored reaction to the cue. The generated cues may be in a form of at least one of video, audio or images, and the user's preferences are stored in a database of preferences.

Embodiments are directed to a method for generating and transmitting experience journeys. The method includes receiving a user's request for an experience journey; retrieving a listing of activities within a prescribed vicinity of the user; retrieving a listing of the user's preferences; eliminating activities from the listing of activities that are contrary to the preferences in the listing of user preferences, thereby forming a listing of preferred available activities; devising routes from the user's location to the activities in the listing of preferred available activities; generating experience journeys from the listing of preferred available activities and the devised routes to the activities in the listing of preferred available activities; and transmitting the generated experience journeys to the user.

Embodiments are directed to a non-transitory computer-readable medium including a set of instructions for generating and transmitting experience journeys that, when executed by a computer, causes the computer to perform operations including: receiving a user's request for an experience journey; retrieving a listing of activities within a prescribed vicinity of the user; retrieving a listing of the user's preferences; eliminating activities from the listing of activities that are contrary to the preferences in the listing of user preferences, thereby forming a listing of preferred available activities; devising routes from the user's location to the activities in the listing of preferred available activities; generating experience journeys from the listing of preferred available activities and the devised routes to the activities in the listing of preferred available activities; and transmitting the generated experience journeys to the user.

BRIEF DESCRIPTION OF DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The disclosed embodiments provide a system that provides for its users journeys, e.g., experience journeys, devised from automatically recommended activities and the routing between them, without interfering with the journey's original purpose. Activities are automatically recommended based on automated and dynamic learning of both the user's preferences and the current status of activities.

Specifically, the disclosed system and method can enable automated creation of activity-specific cues for the non-invasive gathering of user preference data in a smart city environment, and can enable an automated, dynamic recommendation system for real-world activities within a smart city environment. Embodiments of the disclosed system and method allow for the dynamic insertion of unexpected or surprising elements into a user's journey without interfering with the original goals of the journey, such as start and end position, and can allow mobility services to benefit from experiential commerce through the insertion of activities into journeys.

In the pending application, the terms "user" and "user of the service" can be understood to refer to an individual, who may be a tourist or visitor using the service/system described herein as at least a part of a holiday, or who may be a local resident using the service/system seeking to add additional benefit and/or interest to journeys they would already be making, such as commuting. The activities described herein can be understood to refer to any opportunity for activities users can engage in or with, e.g., meals in restaurants, visits to cinemas and/or other forms of leisure activity. Activities can include dynamic activities, such as watching street performers, walks, looking at scenery, etc., and can include leisure-based activities, such as activities centred on business, education, retail, fitness, etc. Moreover, embodiments can utilize smart city feeds, which can be understood to refer to data feeds provided by available sources in a smart city scenario. Such sources can be understood to be, e.g., sources used as part of smart city infrastructure, such as street cameras, traffic sensors, etc. These sources can also include camera feeds on vehicles, data collected from user mobile devices, and social media feeds.

Figure 1:
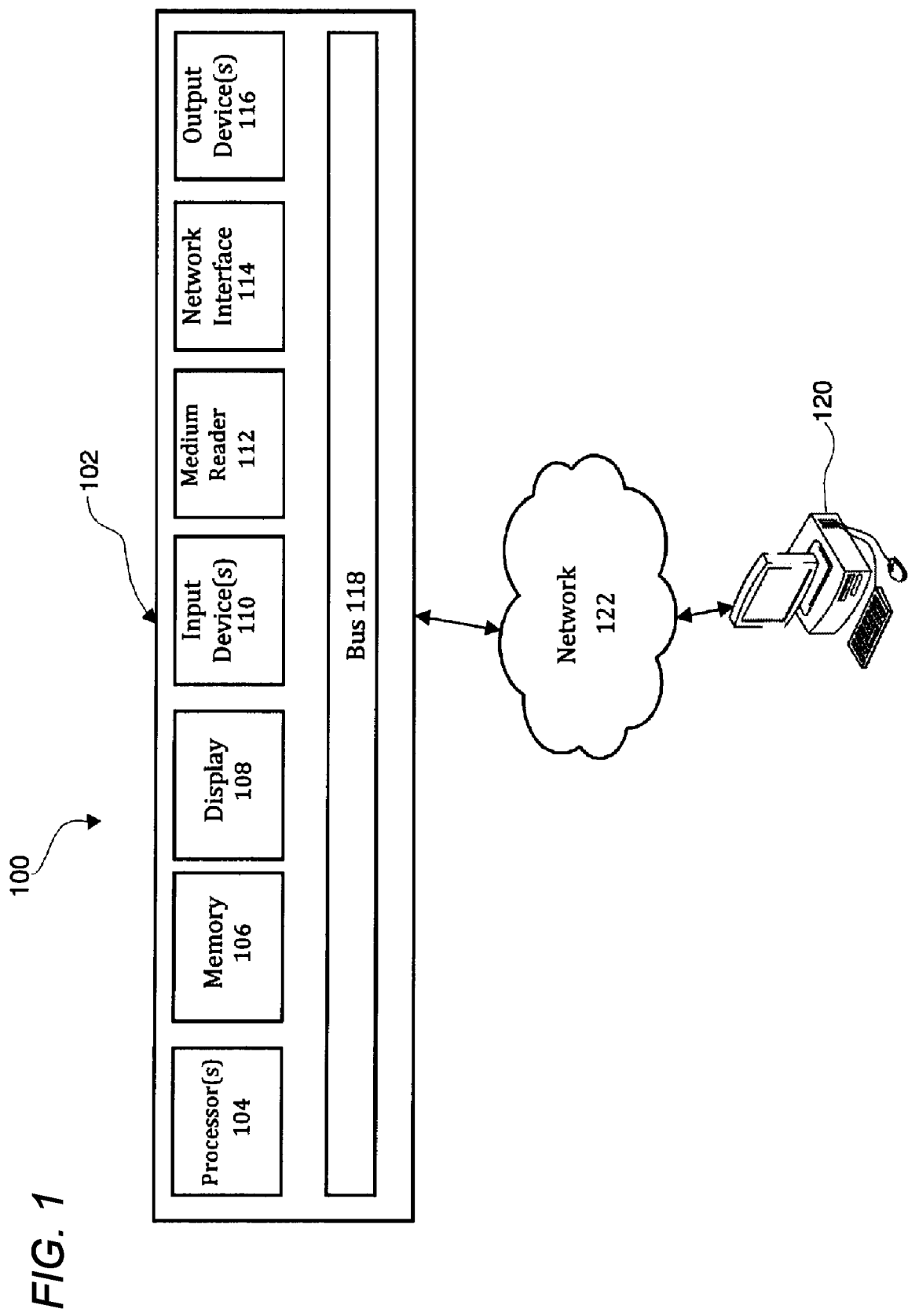
FIG. 1 illustrates an exemplary computer system for providing mobility services capitalization on experiential commerce, according to an aspect of the present disclosure.

FIG. 1 is an exemplary computer system for use in accordance with the embodiments described herein. The system 100 is generally shown and may include a computer system 102, which is generally indicated. The system 100 may be used to, for example, generate and transmit experience journeys to satisfy user's requests.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read anyone or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, ZigBee, infrared, near field communication, ultra band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, an autonomous vehicle, a drone, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the computer device 120 may be any combination of devices and apparatuses. For example, as described above, the computer device 120 may be, or be included within, an autonomous vehicle or a drone.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

As described herein, various embodiments of the disclosed system can be a stand-alone system or incorporated into another system, e.g., a ride-sharing system, travel and tourism system, etc. In a non-limiting example, a user of a ride-sharing service may seek an excursion to enhance the ride-share through use of the disclosed system. In this example, the user may enter data into a user interface in a mobile device, laptop, tablet, etc., requesting automated generation of an excursion and inputting certain parameters, such as starting/ending time or location, range to detour from ride-share trip, etc. Through the use of the user's parameters, the system, through a database of activities and activity types, retrieves a listing of available activities for the user along the ride-share trip. Moreover, rather than merely listing all available activities for the user to scroll through, the system automatically retrieves the user's preferences to various activities and activity types, which are stored in a system database, and can cull non-preferred activities and activity types from the retrieved listing of available activities and activity types so that only activities and activity types that correspond to the user's preferences are considered to answer the user's request. The system can then prepare routes to the activities and transmit these activities and routes to the user for review and selection.

In embodiments, it may be that when the system is comparing the user's preferences to the available activities or activity types, the database of user preferences provides insufficient data to allow the system to determine whether an activity or activity type would be within the user's preferences. In such embodiments, the system may query the user with various activities and/or activity types so as to gauge the user's reaction/feelings to such activities and/or activity types. The user's reactions/feelings can be associated with the user's ID and stored in the system database.

Figure 2:
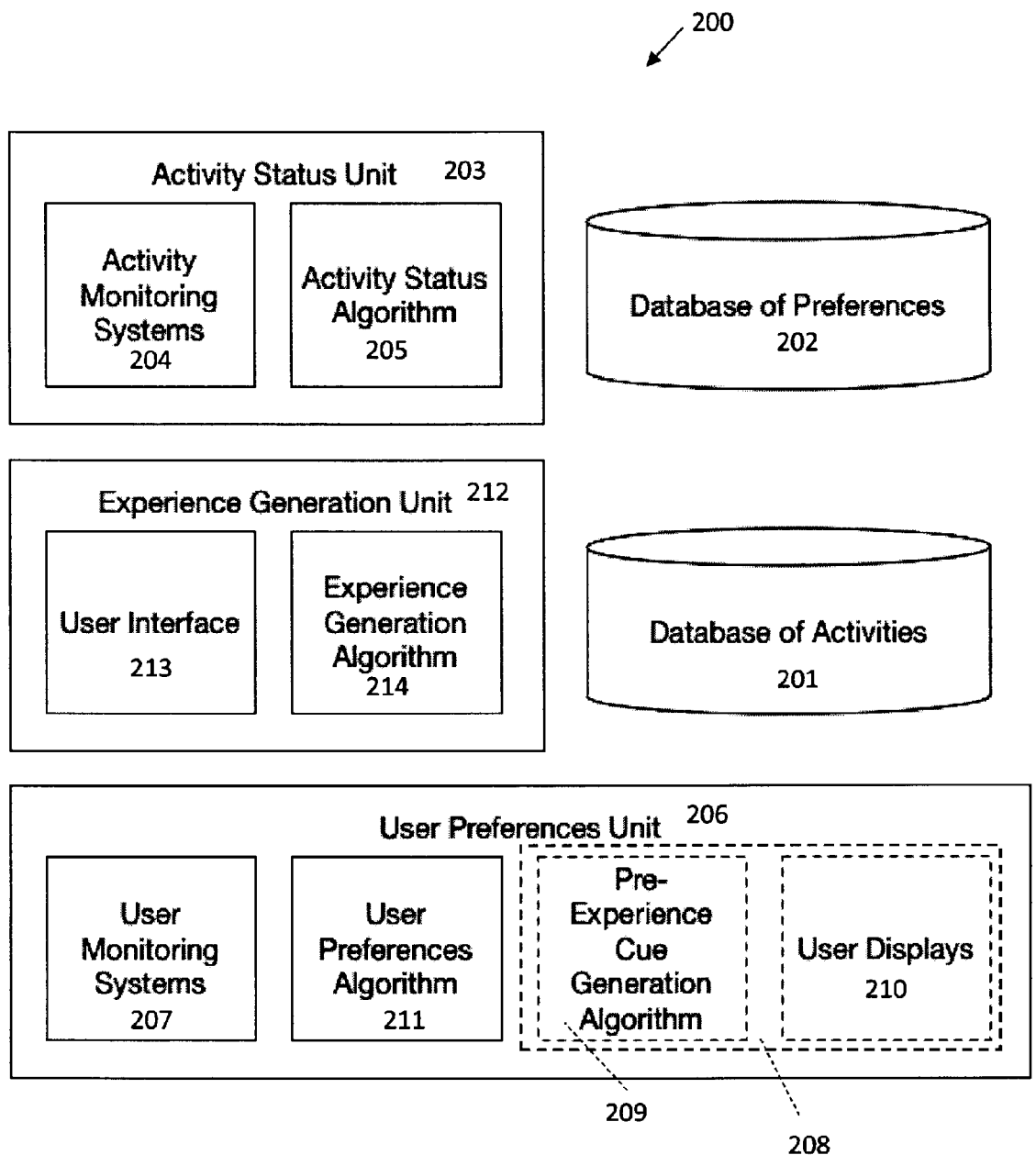
FIG. 2 illustrates an exemplary embodiment of a system for automatic creation of experience journeys.

Referring to FIG. 2, a schematic representation of an embodiment of an exemplary system 200 for providing mobility service capitalization on experiential commerce is illustrated.

In the exemplary embodiment, system 200 can include a database of activities 201, a database of preferences 202, an activity status unit 203, and experience generation unit 212 and a user preference unit 206 in order to perform the mobility service according to the embodiments.

In exemplary system 200, a database of activities 201 is configured to contain indexed lists of activities and associated data. Database of activities 201 can be formed by one or more computer-readable mediums from which data and executable instructions can be read by a computer. Moreover, database of activities 201 may be a random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art, and can be located locally or remotely from the computer and/or reside in the cloud. Database of activities 201 is configured to be under the control of a service provider of the exemplary mobility service.

Database of activities 201 can be an indexed database in which each specific activity is provided with special data associated with the specific activity. In this manner, the database can be easily searched to find specific activities that may be of interest to the user. The indexes for searching and retrieving specific activities can include data related to each specific indexed activity, e.g., an activity ID, an activity type, an activity status and activity status sources. Activity IDs can be unique identifiers assigned to each specific activity, e.g. a unique identification number assigned to the activity, and activity types can be assigned and utilized to designate what type or category a specific activity belongs to, e.g., "eating", "exploring", "exercising", etc. Activity types can also include sub-types or sub-categories to more specifically designate the activity type, e.g., "restaurant", "picnic" or "lunch" etc. may be sub-types or sub-categories of activity type "eating".

While some of the activities may be in public parks or along public streets, many of the activities are performed in private venues, such as restaurants, health clubs, etc. Owners of these private venues can contact the providers of the disclosed system to request inclusion of their activities in the system/database of activities 201. Moreover, these private venues may pay a subscription fee or other value to remain in the database of activities 201. Further, if users, on their own, find activities not recommended by the system, users can recommend inclusion of such activities into the database of activities 201 for the enjoyment of other users.

Activity status can be understood as an indicator of a current status of a specific activity based upon a query of a number of predefined metrics. At its simplest, activity status can include metrics that are binary in nature that can be used to find a specific activity of interest is, e.g., "present" or "not present" in a predefined range of a journey queried for the user, or whether the specific activity of interest is, e.g. "open" or "closed" at the time of day when the query for the user's journey is being run. However, it is to be understood that activity status may also include other metrics that provide more detailed data related to the activity, e.g., how busy the activity is, or whether the activity has recently undergone a change. In this regard, specific metrics may be chosen based on how appropriate they are for the specific activity type they are to be assigned to. Thus, through a collection of the above-noted different metrics, the activity status, i.e., current status of a specific activity, can be ascertained.

Activity status sources can include smart city feeds and social media and other Internet feeds. A listing of smart city feeds associated with specific activities can be stored in database of activities 201 as activity status sources. Smart city feeds, such as street cameras and/or traffic sensors, may be under the control of a local government, municipality, federal government, public/private entity or non-public entity, and these feed can be made available to the system, e.g., on a subscription basis, by lease or other agreement with the entity controlling the smart city feeds. Activity database 201 can associate specific available smart city feeds located in an observable or monitorable vicinity of specific activities so that activity status of the specific activity can be determined and retrieved. Additionally, the social media and other Internet feeds can be identified as activity status sources from which activity status information can be retrieved.

Database of activities 201 can also include general activity information relating to activities, such as its location, the average amount of time spent doing the activity etc.

In embodiments, database of activities 201 can also include an activity theme, which can be understood to be a broad theme category that characterizes the activity, e.g., "exciting", "relaxing", "romantic", etc. Some activities may be classified into multiple activity themes, e.g., an exercise activity may be classified as "healthy" and "exciting".

In the exemplary embodiment of FIG. 2, database of preferences 202 is configured to contain data on the user's preferences for each user using the service. Database of preferences 202 can be formed by one or more computer-readable mediums from which data and executable instructions can be read by a computer. Moreover, database of preferences 202 may be provided together with database of activities 201 are located separately therefore. Further, database of preferences 202 may be a random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art, and can be located locally or remotely from the computer and/or reside in the cloud. Database of preferences 202 is configured to be under the control of a service provider of the exemplary mobility service.

In embodiments, database of preferences 202 can store a unique identifier for each user, e.g., an identification number, as a user ID, and a profile for each user detailing user's preferences for certain activity types, as user preferences. The user profile can record user ratings for each activity type. In simple embodiments, the user profile can include a binary "like" or "dislike" rating for some or all activities types. In more advanced embodiments, additional data can be recorded, such as detailing each activity type preference as a function involving several variables, which may include time (of day, month, year etc.), weather, user's schedule, etc.

User monitoring sources can include the smart city feeds, such as street cameras and/or traffic sensors. A listing of specific smart city feeds that can be used to collect data useful in determining user preference information of a particular user is retrievable from database of preferences 202. User monitoring sources can include identifiers for particular cameras or sensors among the smart city feeds that are available to the system in order to gather data on specific user's interactions with specific activities. User monitoring sources can also include identifiers of functions located in or on the user's mobile device that the system has been granted access to, e.g., location services and microphones.

Activity status Unit 203 is configured to process data retrieved from smart city feeds to update the activity status of activities in database of activities 201. Activity status unit 203 can include activity monitoring system 204 and activity status algorithms 205 configured to observe or monitor activities and to determine each activity's status. Activity monitoring system 203 can be understood as a subset of the smart city feeds, which provide data useful for observing or monitoring activities and determining each activity's current status. Activity monitoring systems 203 can be indexed in the database of activities 201 as activity status sources. By way of non-limiting example, activity monitoring systems 203 can include camera feeds, including traffic cameras, which capture footage of a specific activity in a vicinity of the camera feeds, footfall sensors that are arranged in a vicinity of the specific activity, mobile devices of users in the vicinity of the specific activity etc.

Activity status algorithms 204 include an algorithm which, for a given activity, uses the associated list of activity status sources in the database of activities 201 to identify relevant activity monitoring systems 203 in a vicinity of the given activity, and then analyzes the data provided by these relevant activity monitoring sources 203 to generate an updated activity status for this given activity. As activity monitoring systems 203 provide a variety of different types of data, which can utilize different processing requirements, activity status algorithms 204 may include a number of known algorithms designed to process whatever data is made available by the activity monitoring systems 203 and relevant to attaining an activity status, e.g., computer vision techniques for processing traffic camera data, text processing for processing social media feeds, numerical counts for processing footfall sensors, etc.

A user preferences unit 206 can be arranged to process data retrieved from smart city feeds to update the user preferences of users in the database of preferences 202. In the exemplary embodiment of FIG. 2, user preference unit 206 can include user monitoring systems 207 and user preferences algorithms 210 configured to monitor user preferences to determine activity preferences for the user. In embodiments, user preference unit 206 can also include a pre-experience cues system 208, pre-experience cue generation algorithms 209 and user displays 210. User monitoring system 207 of user preferences unit 206 can be understood as a subset of the smart city feeds, which provide data useful for determining user preferences. User monitoring systems 207 can be indexed in database of preferences 202 as user monitoring sources. It can be easily recognized that many of the indexed user monitoring sources are the same sources indexed as activity monitoring sources in activity monitoring system 204. User monitoring systems 207 can be configured to utilize the user's mobile device for location tracking and audio recording, as well as cameras on vehicles or fixed cameras which can capture footage of the user as user monitoring sources.

User preferences unit 206 can also include user preferences algorithm 211, which, for a given user, uses an associated list of user monitoring sources in the database of preferences 202 to identify relevant user monitoring systems 207, and then analyzes the provided data to generate and/or update the user preferences for this given user. The user may be monitored while interacting with activities identified in the database of activities 201 such that the user's preference for activities of a specific activity type and/or reaction to activities of a specific activity type may be recorded. As user monitoring systems 207 provide a variety of different types of data, which can utilize different processing requirements, user preferences algorithms 211 may include a number of known algorithms designed to process whatever data is made available by the user monitoring systems 207 and relevant to attaining user preferences/reactions to specific activity types.

In embodiments, user preferences unit 206 can include a pre-experience cues system 208 that can include pre-experience cue generation algorithms 209 and user displays 210. Pre-experience cues system 208 can be configured to generate cues or pre-experience cues, which include content related to particular activities. Pre-experience cues may be video, audio, images, etc., such that users can view and/or interact with them while being monitored by user monitoring systems 207. Pre-experience cue generation algorithms 209 of pre-experience cues system 208 can generate pre-experience cues for potential activities that are being evaluated for future inclusion in an experience journey. The pre-experience cue generation algorithms 209 can be configured to utilize resources stored in as general activity information in database of activities 201 and can preferably create pre-experience cues for activity types that do not already have data stored for the user preferences. User displays 210 can include screens and displays available for displaying the generated pre-experience cues to the user. Such user displays 210 can include displays of user mobile devices, displays in modes of transport, etc.

In embodiments user preference unit 206 including pre-experience cues system 208, in addition to monitoring the user interacting with activities identified in the database of activities 201, with pre-experience cues can be provided to the user so that the user's preference or reaction to specific activity types used in the cue can be recorded for evaluation by user preferences algorithm 211.

Experience generation unit 212 of system 200 is configured to generate tailored journey plans that include specific activities and the routes between these activities, also referred to as "experience journeys". Experience generation unit 212 can include user interface 213 and experience generation algorithm 214 so that, based upon user input, experience journeys can be generated from data retrieved from database of preferences 202 and database of activities 201.

User interface 213 of experience generation unit 212 can be configured to allow the user to input data related to activities the user would like to undertake in an experience journey. This data, referred to as journey parameters, may include, e.g., desired departure and arrival times, starting and ending locations, etc., as well as acceptable tolerances or ranges from which the experience journey can deviate from the current journey. Journey parameters may also include tolerable limits for how busy an activity is. User interface 213 can also display the details of experience journeys generated for the user. It is understood that user interface 213 can be provided through a mobile device, website or other medium.

Experience Generation algorithms 214 of experience generation unit 212 can include an algorithm configured to consider input journey parameters, user preferences from database of preferences 202, and activity type, activity status and general activity information to select activities to include in experience journeys for the user, and then to generate routes which include these activities. In embodiments, experience generation algorithms 214 can also consider activity themes when selecting activities for the user's experience journeys and generating the routes.

Figure 3:
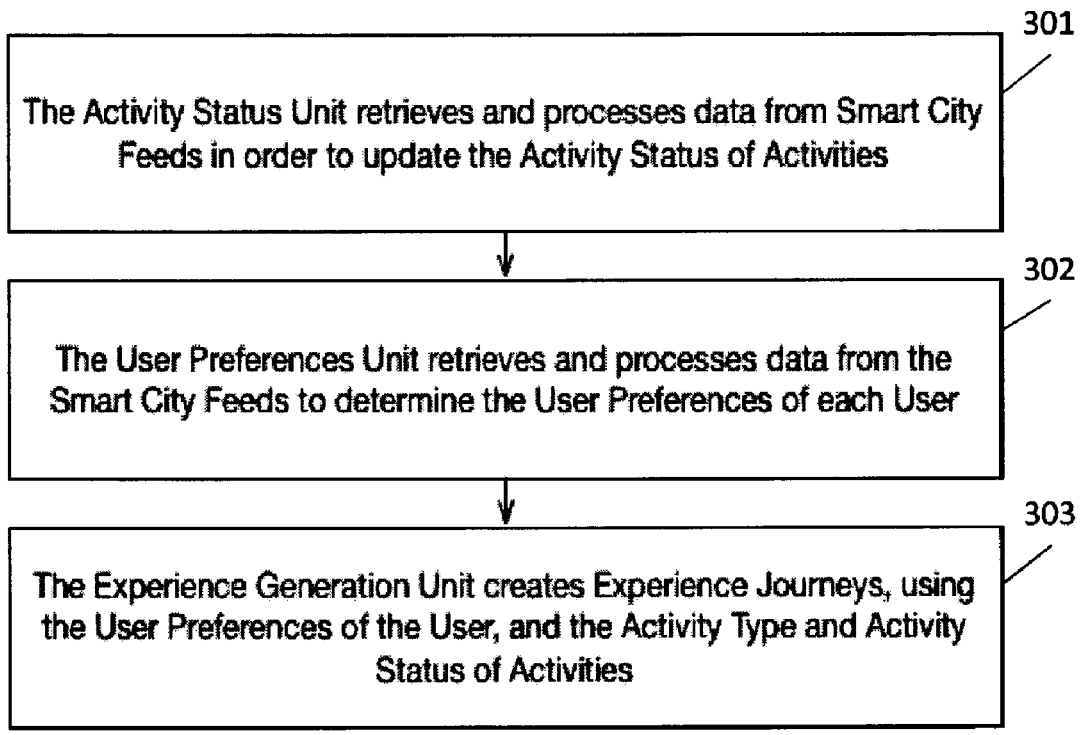
FIG. 3 illustrates an exemplary flow diagram of the automatic creation of experience journeys.

An exemplary flow diagram is illustrated in FIG. 3, which describes at a high level a method for creating journey plans for users of the system. The illustrated flow diagram explains the process by which curated journey plans containing activities for users of the service and the routing between these activities are automatically created. These journey plans are created based on user preference data and activity status data which are gathered and processed without human input.

In the exemplary flow diagram of FIG. 3, at step 301, activity status unit 203 retrieves and processes data from smart city feeds in order to update activity status of activities stored in database of activities 201. This updating may be performed periodically at scheduled times, upon occurrence of a particular, event such as a change in status of an activity, upon a request from the experience generation unit 212, or upon some other trigger. Depending upon the activity type, this triggering may be done multiple times, whereby user preferences for each user can also contain temporal data, e.g., gauging interest in a certain activity at certain times of the day. At step 302, user preferences unit 206 can retrieve and process data from the smart city feeds to determine user preferences of each user, and these preferences can be stored in database of preferences 202. This retrieval and processing of data can be triggered upon recognition of a user in a vicinity of an activity or activity type to be assessed, or can be triggered periodically in accordance with a predetermined schedule. At step 303, experience generation unit 212 can create experience journeys, taking into account a user's preferences for specific activity types and the activity status of such activities from database of activities 201. This process can be initiated or carried out when a user requests generation of an experience journey via the user interface 213, e.g., on a smart device, and then inputs journey parameters in support of the request. The database of preferences 202 can be updated with the user preferences of the user ascertained by user preference algorithm 211.

Figure 4:
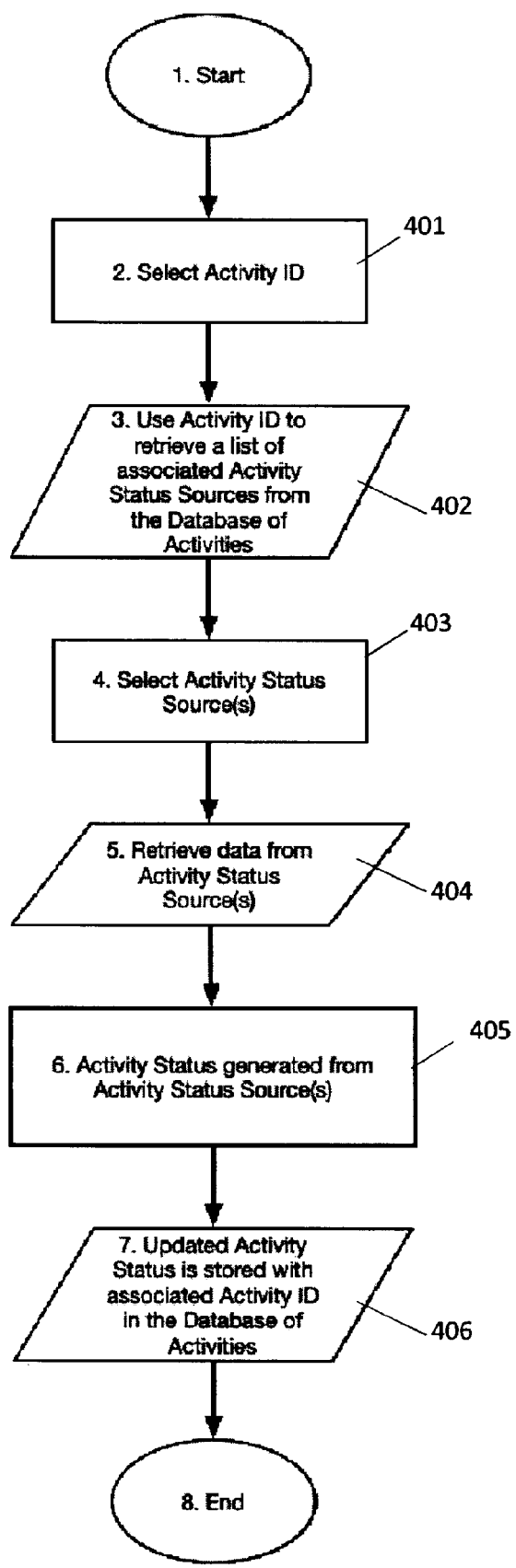
FIG. 4 illustrates an exemplary flow diagram of an activity status algorithm.

FIG. 4 shows an exemplary flow diagram of the activity status algorithm 205 performing the process of step 301 in FIG. 3. In accordance with the method for creating journey plans for users of the system, an activity ID can be selected at step 401. For this selected activity, the activity status algorithm 205 can use the activity ID to retrieve a list of associated activity status sources in the database of activities 201 at step 402. Activity data sources can be selected at step 403 and raw data can be retrieved from the selected activity status sources 205 or from the activity monitoring systems 204 identified by the activity status sources 205 at step 204. This raw data retrieval can be initiated by an instruction sent from the activity status algorithm 206 to begin recording data.

At step 405, activity status algorithm 205 can process raw data from activity monitoring systems 204 to output an activity status for an associated activity. Depending on the type, or types, of raw data being processed by the activity status algorithm 205, different processing may be utilized. For example: Computer vision algorithms may be used on raw video data to assess, e.g., a "presence" or "absence" of a street performer, outputting a binary activity status; counting algorithms may be applied to data from footfall sensors to measure the number of pedestrians on the street near an activity, outputting a numerical activity status indicating how busy the area is; and text processing algorithms may process social media feeds associated with the activity, outputting an activity status that may include data on what the activity is currently offering, information on sales, etc.

Database of activities 201 can be updated with the current activity status stored with the associated activity ID ascertained by activity status algorithm 205 at step 406.

Figure 5:
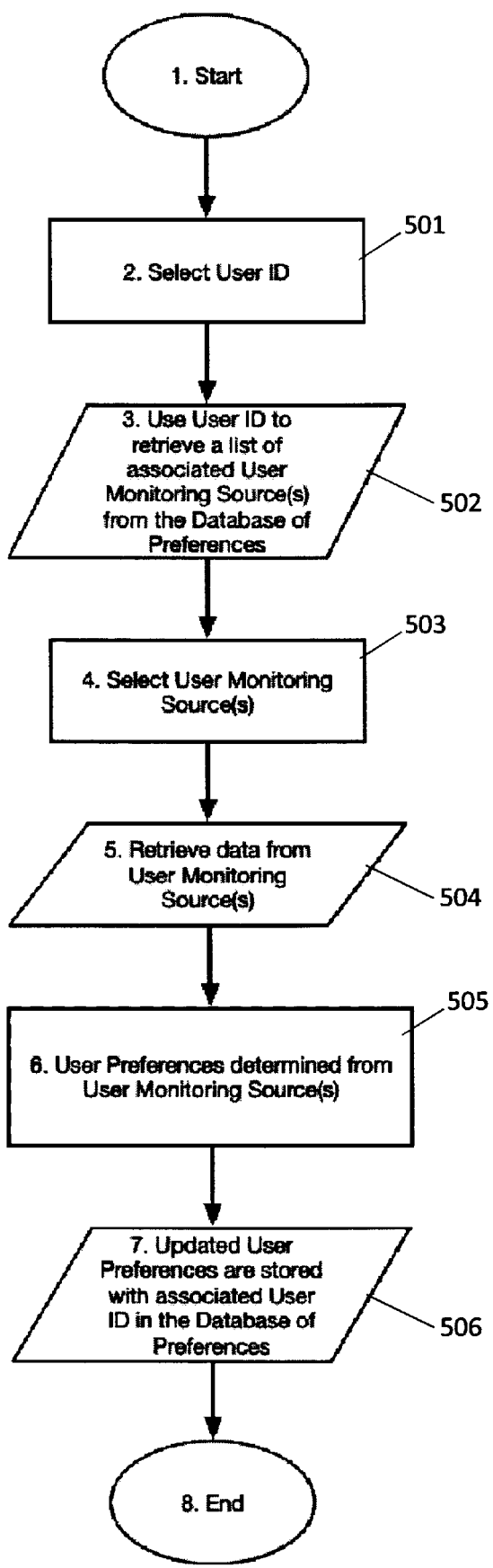
FIG. 5 illustrates an exemplary flow diagram of a user's preferences algorithm.

FIG. 5 shows an exemplary flow diagram of the user preferences algorithm 211 performing the process of step 302 in FIG. 3. In the performance of the method, a user ID can be selected at step 501. For the selected user ID, a list of associated user monitoring sources can be retrieved from the database of preferences 202 at step 502. Further, in embodiments, the retrieval and processing of data by user preferences unit 206 can be been triggered by the user coming into the proximity of an activity. User monitoring sources can be selected at step 503 and data can be retrieved from these selected user monitoring systems 207 at step 504. This process can be performed by sending an instruction from the user preferences algorithm 211 to begin recording data.

At step 505, user preferences algorithm 211 can process raw data from user monitoring systems to output user preferences. Depending on a type, or types, of data being processed by the user preferences algorithm 211, different processing may be utilized. For example: Location data of the user's mobile device, and the location data of the activity as provided in the general activity information in the database of activities 201 can be used to assess a reaction of the user to the activity. For example, user position data may be correlated to determine whether the user stops to observe the activity or passes by it immediately, thereby resulting in simple "like" or "dislike" user preferences for activities of that activity Type. Further, computer vision algorithms may be used on raw video data to assess, e.g., facial expressions or body language of the user as the user encounters an activity. In embodiments, this technique could be applied to events or activities not stored in the database of activities, by using computer vision algorithms to first recognize and categorize the type of event or activity the user encountering. Such methods could allow more advanced categorization of user preferences, such as placing each activity type on a scale of "like" to "dislike" based on facial expression/body language intensity.

Database of preferences 202 can be updated with the updated user preferences stored with the associated activity ID ascertained by activity status algorithm 205 at step 506.

Figure 6:
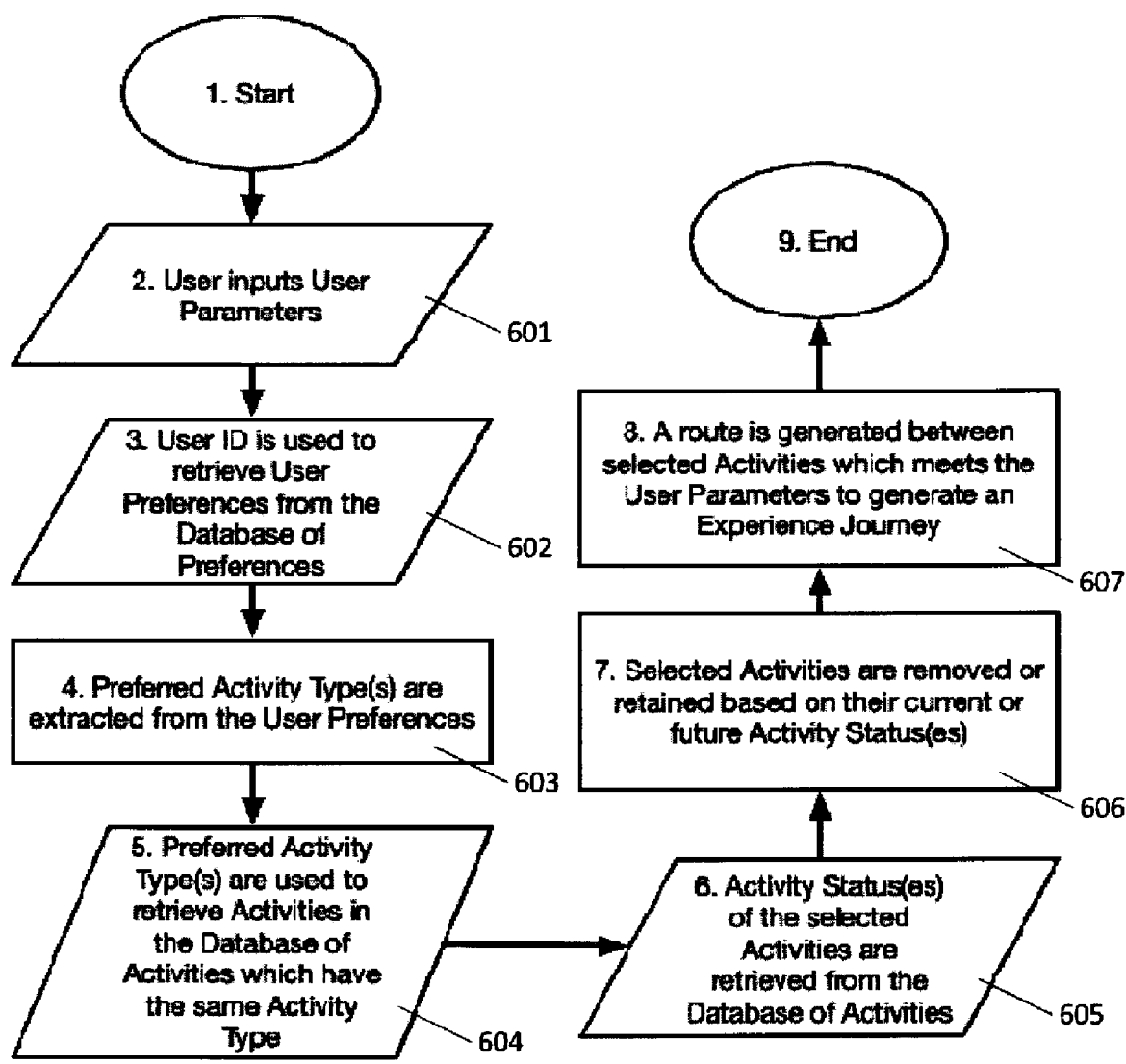
FIG. 6 illustrates an exemplary flow diagram of an experience generation algorithm.

FIG. 6 shows an exemplary flow diagram of the experience generation algorithm 214 performing the process of step 303 in FIG. 3. The user inputs user or journey parameters into the user interface at step 601. By searching the user's user ID, experience generation algorithm 214 can retrieve the user's user preferences from database of preferences 202. The user's preferred activity types can be extracted from the user preferences at step 603 and the preferred activity types from the user preferences can be used to retrieve, at step 604, activities in database of activities 201 that are of a same activity type. As the identified activities can be further refined by their associated activity statuses, which indicate whether these activities are available and in accordance with the user's journey parameters, the activity status of the selected activities are retrieved from the database of activities at step 605.

Selected activities can be removed or retained based upon their current or future activity status at step 606. In this regard, activities selected by activity type may include all activities with a "like" in the user preferences, and/or exclude all those with a "dislike". In embodiments, user profiles can contain more data so that the system may preferentially select activities based on their activity type and additional variables, such as the times when an activity of that activity type would be preferred. In this regard, activities selected by activity status may exclude all activities with activity statuses that indicate closure or absence of the activity, or may include further criteria for selection, such as selecting only activities with activity statuses indicating they are less busy than the limit input with the user's journey parameters. Further, selection of activities may be restricted unless they are, e.g., within a spatial and/or temporal window indicated as acceptable by the user's journey parameters. For example, the journey parameters can establish that only activities within a certain distance of the most efficient route to be traveled between the starting point and the ending point may be selected. Moreover, this certain distance may be modified based on input tolerances for arrival time and position.

A route may be generated between the selected activities that meet the user/journey parameters to generate an experience journey at step 607. In this regard, experience generation algorithm 214 can generate journeys which include the selected activities and routes between them. Many journeys may be generated, and ranked based on metrics such as: likely enjoyment of the journey, which can be based on the number of included activities of activity types that match those in the user preferences; and how well the journey fits the user's input journey parameters, i.e., how much of a delay will there be the user's desired arrival time if the journey is undertake, or how much displacement from desired arrival position would taking this journey cause. The journey which ranks the highest may be shown or offered to the user via user interface 213 as an experience journey, along with key information such as total number of activities, total distance travelled, and departure and arrival times and places.

In embodiments, experience generation algorithm 214 may generate a selection of varied experience journeys based upon different broad themes, such as "exciting journey", "relaxing journey", "thoughtful journey" etc., by selecting activities for each journey that are of a same activity theme. These experience journeys of different themes may be presented to the user via the user interface 213, so that the user can select an experience journey that fits their current mood.

In embodiments, pre-experience cues may be generated in user preferences unit 206 to provide activity-specific data to user preferences algorithm 211. This may be advantageously done, for example, when there is insufficient user preference data for a particular activity type, or may be included in an ongoing experience journey to provide real-time user preference information for dynamic insertion of activities into the journey. These pre-experience cues can be achieved by content and information related to a particular activity, such as a sushi restaurant, or an activity type, such as eating activities in general, being retrieved from sources including general activity information in the database of activities 201, or the Internet. Pre-experience cue generation algorithm 209 can use this retrieved data to produce pre-experience cues, e.g., video, imagery, or audio content related to an activity or activity type that user preference data is sought, for display on user display 210.

Pre-experience cues can be displayed to the user on display devices 210 and user's response to these pre-experience cues can be recorded. The user responses can be recorded using user monitoring devices, such as camera feeds or microphones, or manual input from the user may be prompted on their user interface, such as selecting a "like" or "dislike" button in response to the displayed pre-experience cue. These recorded user responses can then be processed by the user preferences algorithm 211 as described in the main method.

As described above, the system described in the pending application can be a stand-alone system or can be a system incorporated into another service-based system. In non-limiting examples of embodiment of the invention, the disclosed system can provide a service offered as part of a ride-sharing service or for a travel and tourism service. By way of example, if the presently described system is offered as part of another service, such as a ride-sharing service, the user, when requesting a ride share, can likewise request through a user interface of the ride-sharing service website, app or other portal for the ride-sharing service generation of an experience journey through the presently described system.

As described above, the user can input certain journey parameters, such as starting/ending time, duration, etc., into the user interface. Upon receipt of these parameters, the system will review the database of activities 201 to find activities in the vicinity of the user that satisfy the user's journey parameters. The system can then, utilizing the user's ID, retrieve the user's preferences and use these preferences to avoid/eliminate activities that would not be of interest to the user based on the retrieved user preferences.

Once the activities that are contrary to the user's preferences have been eliminated, the system will calculate the routes to the activities based on, e.g., the user's current location via the ride-sharing service, to generate one or more experience journeys and transmit these experience journeys to the user interface for the user's review and consideration. The user can select one of the displayed experience journeys in which to participate.

In embodiments, in the event that the system, after receipt of the user's journey parameters, discovers one or more activities or activity types that fit the journey parameters but do not have associated preferences stored in the database of preferences 202, the system can query the user through the user interface regarding preferences for the unassociated activities or activity types. These preferences can be stored in the database of preferences 202 for future retrieval and can be used in generating the experience journeys for the user's review in the instant request, i.e., the system can eliminate activities or activity types that the user shows no interest or dislike.

While FIGS. 3 to 6 show exemplary flow diagrams of the present disclosure, it is to be known and understood that these methods are not limiting or exhaustive. Additional or alternative methods may be implemented in accordance with any of the features described herein with respect to the remaining embodiments.

Additional Embodiment

Hereinafter, an example of a journey service provision system for providing a user with the implementation of a journey plan generated by the System shown in FIGS. 1 and 2 will be described. In order to make the following description easy to understand, as a journey plan, journey based on the user's past experience at a certain point in time (hereinafter referred to as "event reproduction journey") is illustrated, and as a service for implementing the journey, a pick-up service by a driving car and a food service by a shop (for example, a restaurant) are illustrated. In addition, the service for implementing the journey is not limited to the service described above, and there may be any number of service elements.

<Overall Configuration of Journey Service Provision System>

Figure 7:
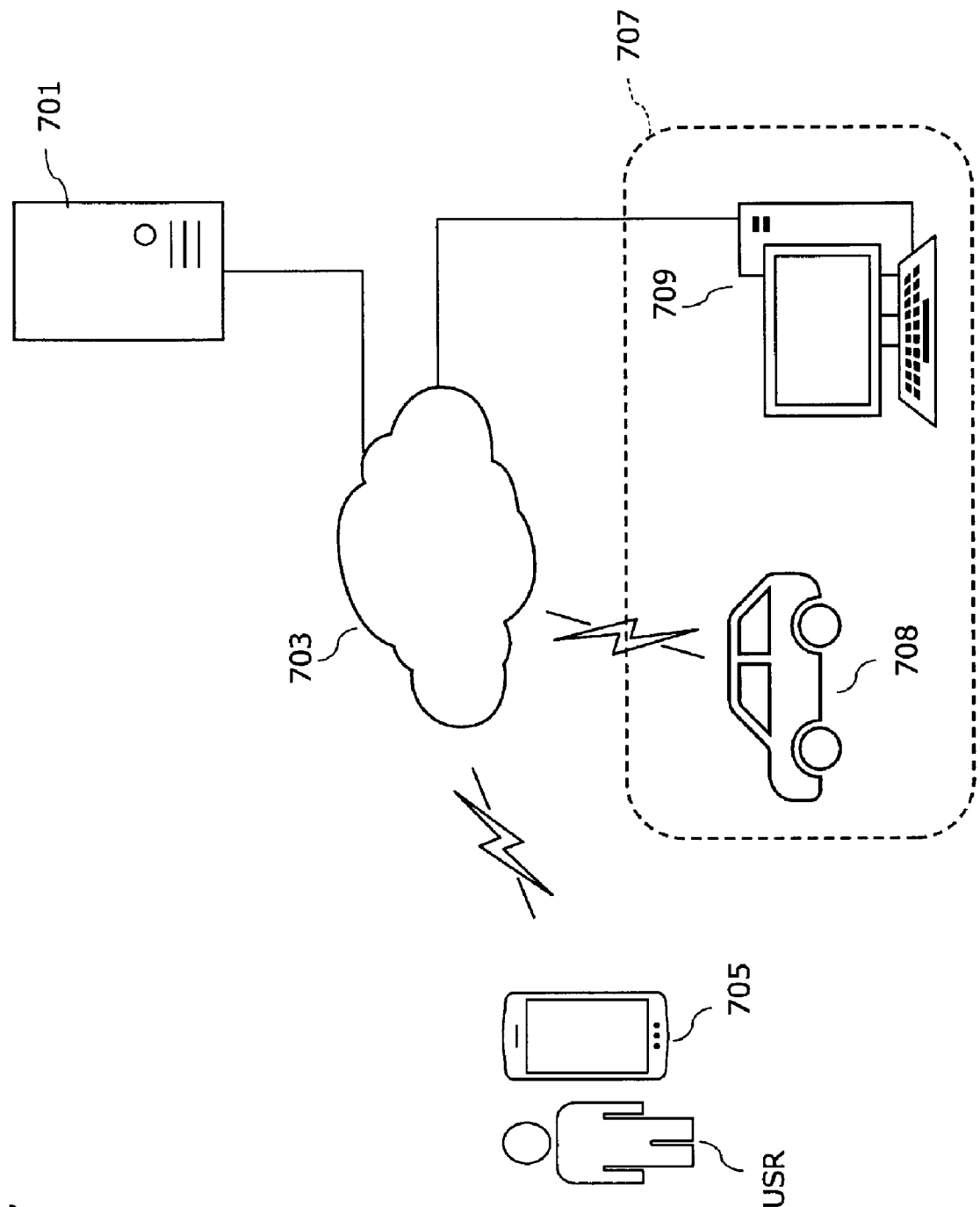
FIG. 7 illustrates a diagram showing an outline of a journey service provision system according to an additional embodiment.

FIG. 7 is a diagram showing an outline of a journey service provision system according to an additional embodiment. As shown in FIG. 7, the journey service provision system includes a server 701, a user terminal 705, and a service provider 707. As described above, in the present embodiment, the service provider 707 includes a vehicle 708 and a shop terminal 709.

Each of the server 701, the user terminal 705, and a device of the service provider 707 is connected through a network 703. The network 703 includes at least a wired or wireless line and is configured to include a part or all of the Internet line, and may include a local area network (LAN), a wide area network (WAN), a cellular phone network, and other types of networks as appropriate, for example.

In the journey service provision system, in order to implement the journey desired by the user 706, the server 701 collectively manages and controls the transmission and reception of data or information between the terminals or autonomous driving vehicle configured in the journey service provision system. The server 701 generates a journey plan based on the conditions designated by the user 706 by the operation of the user 706, and arranges a service provider to implement the journey plan when the approval of the user 706 is obtained. The specific internal configuration of the server 701 will be described below with reference to FIG. 8.

The user terminal 705 is a terminal owned by the user 706 who requests journey plan generation, and is a portable terminal such as a smartphone or a tablet terminal capable of wireless communication, for example. The user terminal 705 generates request information for journey plan generation by the operation of the user 706, sends the information to the server 701, and receives the journey plan information from the server 701. In addition, by the operation of the user 706, the presented journey plan is approved, and the server 701 is requested to arrange services configured in the journey plan. A specific internal configuration of the user terminal 705 will be described below with reference to FIG. 9.

The vehicle 708 is an autonomous driving vehicle of which journey is permitted by the server 701. When receiving a reservation request from the server 701, the vehicle 708 confirms the schedule by the operation of a manager (not shown) of the vehicle 708, determines the reservation availability of the vehicle 708, and transmits the determination result to the server 701. Further, the vehicle 708 travels in accordance with the journey plan accepted by the server 701. The specific internal configuration of the vehicle 708 will be described below with reference to FIG. 10.

The shop terminal 709 is configured of a computer such as a personal computer (PC), for example. The shop terminal 709 is a terminal used by a shop manager (not shown) that manages a shop receiving a request from the server 701. When receiving a reservation request from the server 701, the shop terminal 709 confirms the schedule by the operation of the shop manager, determines the reservation availability of the shop, and transmits the determination result to the server 701. The shop provides the service in accordance with the content of the reservation. The specific internal configuration of the shop terminal 709 will be described below with reference to FIG. 11.

<Server Configuration>

Figure 8:
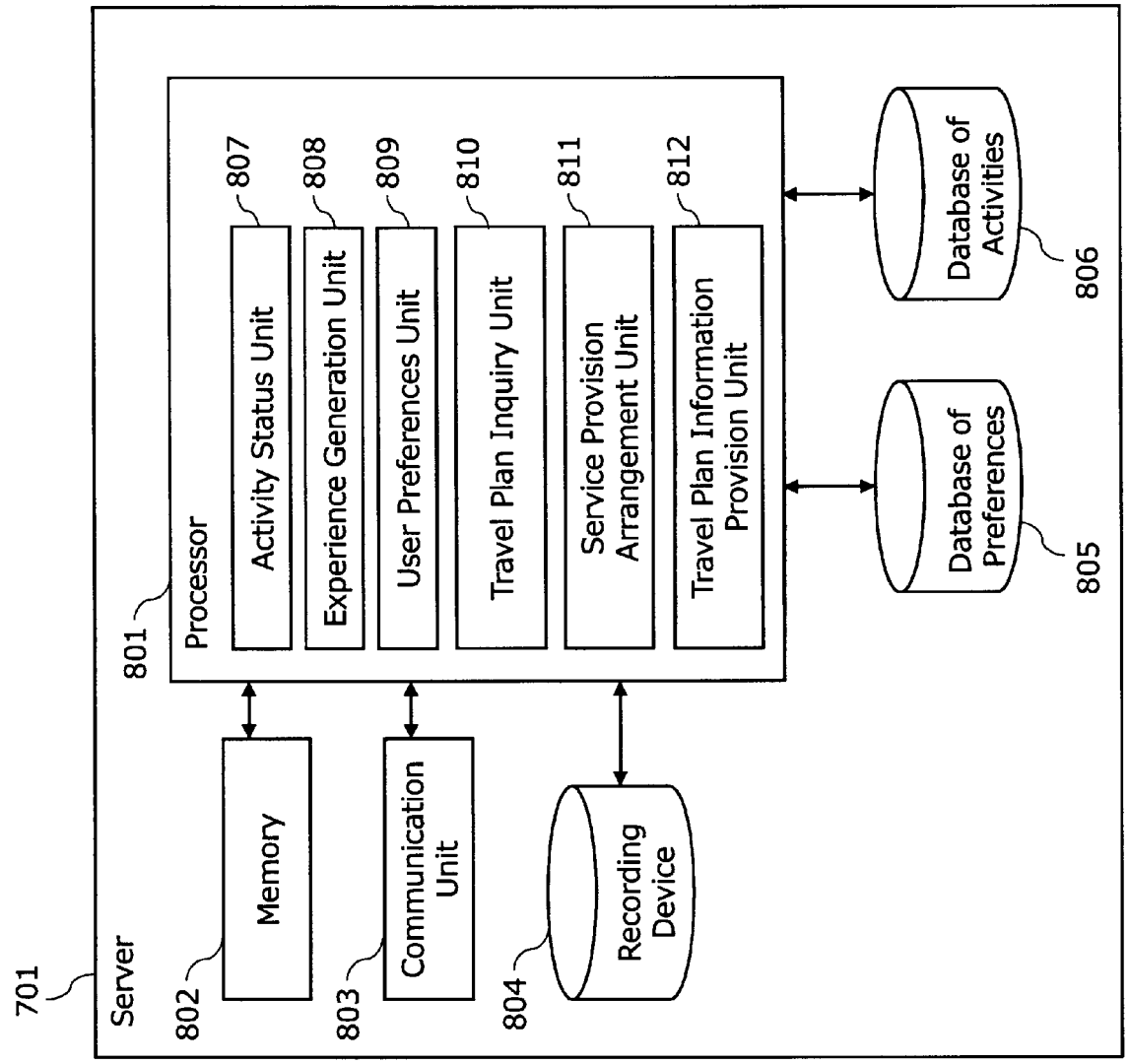
FIG. 8 illustrates a block diagram showing a configuration of the server shown in FIG. 7.

FIG. 8 is a block diagram showing a configuration of the server 701 shown in FIG. 7. The server 701 includes a processor 801, a memory 802, a communication unit 803, a recording device 804, a database of preferences 805, and a database of activities 806. The server 701 may be built on-premises, or may be built using a cloud service.

The memory 802 is configured using a primary storage device (for example, random access memory (RAM), and read only memory (ROM)), and temporarily stores programs necessary for execution of the operation of the server 701, and further, data or information generated during the operation. The RAM is a work memory used when the processor 801 operates, for example. The ROM stores a program for controlling the processor 801 in advance, for example. Further, the memory 802 stores user information with respect to each of a plurality of users 706 registered as users. In addition, each user information may include information of a User ID, a mail address of the user terminal 705 owned by the user 706, identification information of the user terminal 705, and a service set identifier (SSID) used at the time of wireless communication, in addition to attributes such as the name, age, and gender of the corresponding user. In this example, the user registration of the user 706 is performed in advance when each user 706 registers as a member of the journey service provision system. The registered user information is stored not only in the recording device 804, but also in the database of preferences 805. The memory 802 also stores information of the SSID used when the vehicle 708 arranged by the service provider selected by the server 701 performs wireless communication, and access information (URL, and the like) to the shop terminal 709.

The communication unit 803 is configured of a communication circuit that communicates with each of the user terminal 705, the vehicle 708, and the shop terminal 709 through the network 703. Examples of a communication method by the communication unit 803 include a wired communication method such as WAN, LAN, power line communication, and a wireless communication method such as WiFi (registered trademark) and mobile communication for mobile phone corresponding to the network 703, for example. For example, the communication unit 803 may receive the information transmitted from the user terminal 705, and may arrange the service with respect to the vehicle 708 and the shop terminal 709 in accordance with the journey plan approved by the user 706.

The recording device 804 is configured using a secondary storage device (for example, a hard disk drive (HDD) or a solid state drive (SSD)) or a tertiary storage device (for example, an optical disk or an SD card). The recording device 804 stores the user information of the user 706 (member) described above and the access information of the service provider (the vehicle 708 and the shop terminal 709).

The database of preferences 805 and database of activities 806 have at least the same functionality as the embodiment described with reference to FIGS. 1 and 2.

The processor 801 is configured using a central processing unit (CPU), a digital signal processor (DSP), or a field programmable gate array (FPGA), for example. The processor 801 serves as a control unit of the server 701, and performs control processing to collectively manage the operation of each unit of the server 701, input and output processing of data to and from each unit of the server 701, arithmetic processing of data, and storage processing of data. The processor 801 operates in accordance with a program stored in the memory 802.

The processor 801 at least configures, as functional (software) configurations that may be realized by executing a program, an activity status unit 807, an experience generation unit 808, a user preferences unit 809, a journey plan inquiry unit 810, and a service provider arrangement unit 811, and a journey plan information provision unit 812.

The activity status unit 807, the experience generation unit 808 and the user preferences unit 809 have at least the same functions as the embodiment described with reference to FIGS. 1 and 2.

The journey plan inquiry unit 810 inquires the user terminal 705 of the journey plan generated by the experience generation unit 808, and determines whether or not the approval of the user 706 is obtained based on a response from the user terminal 705.

The service provider arrangement unit 811 arranges the service provider 707 (the vehicle 708 and the shop terminal 709) to make a reservation for service and the like, in accordance with the journey plan approved by the user 706.

The journey plan information provision unit 812 provides the information of the previously-implemented journey plan that is recorded in the recording device 804, to a user who has implemented the journey plan, a user who is registered as a member, and the like, through the network 703.

<Configuration of User Terminal>

Figure 9:
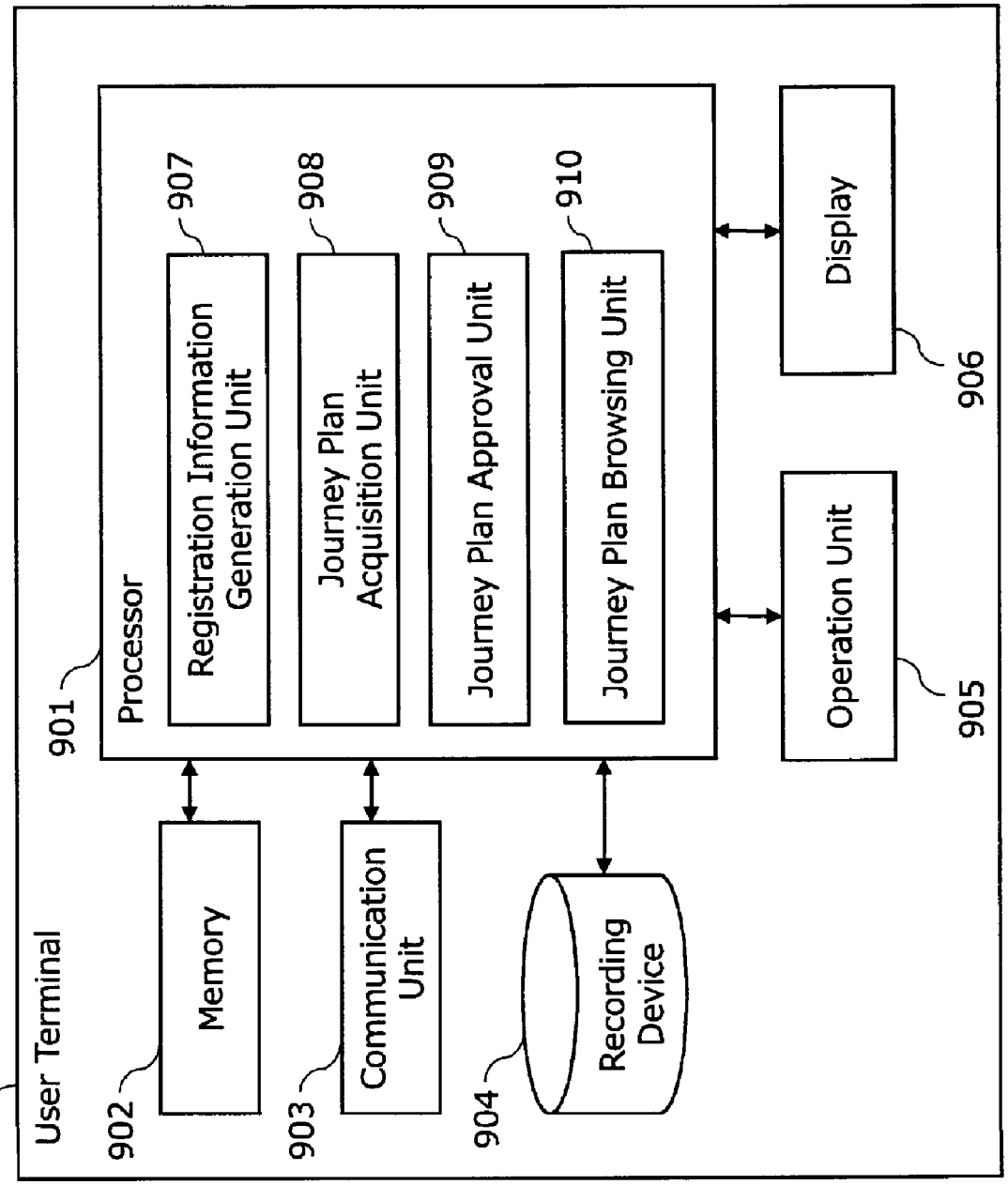
FIG. 9 illustrates a block diagram showing a configuration of the user terminal shown in FIG. 7.

FIG. 9 is a block diagram showing a configuration of the user terminal 705 shown in FIG. 7. The user terminal 705 is configured to include a processor 901, a memory 902, a communication unit 903, a recording device 904, an operation unit 905, and a display 906. The user terminal 705 is a terminal used by the user 706, and receives an input of request information including various information such as contents of journey that the user 706 wants to implement, by an operation of the user 706.

In the present embodiment, an example in which an application program for realizing the journey service provision system is installed in the user terminal 705 will be described.

The memory 902 is configured using a primary storage device (for example, a RAM, a ROM), and temporarily stores programs necessary for execution of the operation of the user terminal 705, and further, data or information generated during the operation. The RAM is a work memory used when the processor 901 operates, for example. The ROM stores a program for controlling the processor 901 in advance, for example.

The communication unit 903 is configured of a communication circuit that communicates with the server 701 through the network 703. Examples of a communication method by the communication unit 903 include a wired communication method such as WAN, LAN, power line communication, and a wireless communication method such as WiFi (registered trademark) and mobile communication for mobile phone corresponding to the network 703, for example. For example, the communication unit 903 transmits the request information passed from the processor 901 to the server 701.

The recording device 904 is configured using a secondary storage device (for example, an HDD or an SSD) or a tertiary storage device (for example, an optical disk or an SD card). The recording device 904 stores the journey plan information of the day of journey transmitted from the server 701. Here, the journey plan information is information including a transit point and planned time of a planned route of the vehicle 708 on the day of journey, a contact point, a reserved time, service provision contents, and the like of a reserved shop, for example.

The operation unit 905 receives an operation of the user 706, and passes data or information input by the operation to the processor 901.

The display 906 is configured with an organic EL display or a liquid crystal display, for example, and displays data or information passed from the processor 901. For example, the display 906 displays the journey plan information of the day of journey passed from the processor 901.

The processor 901 is configured using a CPU, a DSP or an FPGA, for example. The processor 901 serves as a control unit of the user terminal 705, and performs control processing to collectively manage the operation of each unit of the user terminal 705, input and output processing of data to and from each unit of the user terminal 705, and arithmetic processing of data, and storage processing of data. The processor 901 operates in accordance with a program stored in the memory 902.

The processor 901 at least includes, as functional (software) configurations that may be realized by executing a program, a registration information generation unit 907, a journey plan acquisition unit 908, a journey plan approval unit 909, and a journey plan browsing unit 910.

The registration information generation unit 907 acquires information necessary for generation of a journey plan input to the operation unit 905 by the operation of the user 706, generates registration information, and transmits the registration information to the server 701 through the communication unit 903.

The journey plan acquisition unit 908 acquires the journey plan presented by the server 701 and causes the display 906 to display the journey plan.

The journey plan approval unit 909 generates the approval and disapproval information regarding a possibility of approval of the journey plan presented by the server 701 according to the instruction input to the operation unit 905 by the operation of the user 706, and transmits the information to the server 701 through the communication unit 903.

The journey plan browsing unit 910 acquires the journey plan browsing information of user himself/herself and other users provided by the server 701 according to the instruction input to the operation unit 905 by the operation of the user 706, and causes the display 906 to display the information.

<Configuration of Vehicle>

Figure 10:
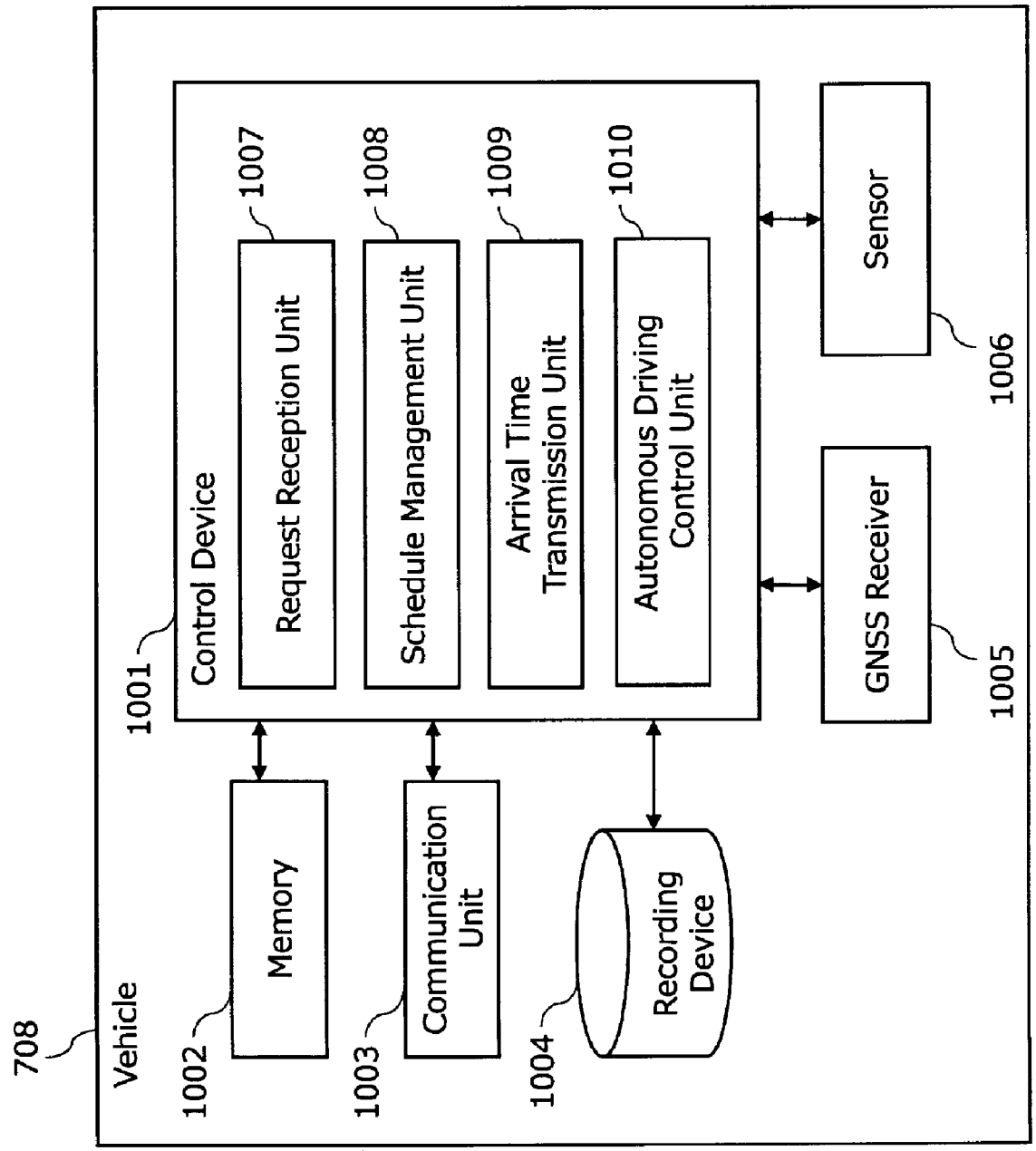
FIG. 10 illustrates a block diagram showing a configuration of the vehicle shown in FIG. 7.

FIG. 10 is a block diagram showing a configuration of the vehicle 708 shown in FIG. 7. The vehicle 708 is configured to include a control device 1001, a memory 1002, a communication unit 1003, a recording device 1004, a global navigation satellite system (GNSS) receiver 1005, and a plurality of sensors 1006. The vehicle 708 is an autonomous driving vehicle, for example, and provides a pick-up service to the user 706 during journey implementation based on the journey plan information from the server 701. In the present embodiment, an example in which an application program for realizing the journey service provision system is installed in the navigation system of the vehicle 708 will be described.

The GNSS receiver 1005 detects positional information of the vehicle 708. Specifically, the GNSS receiver 1005 receives satellite positioning signals indicating the transmission time and the position (coordinates) of each GNSS satellite from each of a plurality of GNSS satellites (not shown), calculates the latitude and longitude of a reception point (that is, the position of the vehicle 708) based on the reception of each satellite positioning signal, and outputs the calculation result to the control device 1001 as the positional information of the vehicle 708.

The plurality of sensors 1006 detect the external environment of the vehicle 708 or the obstacles around the same, and output the detection results to the control device 1001. Examples of the sensors 1006 include a camera, a millimeter wave radar, a sonar radar, a LiDAR (Light Detection and Ranging, Laser Imaging Detection and Ranging: LiDAR), and the like, for example. The camera includes an imaging device such as a Charge Coupled Device (CCD) or a Complementary Metal Oxide Semiconductor (CMOS), for example. The camera is installed on the platform of the vehicle 708, captures an image of a predetermined range outside the vehicle as a detection range, and outputs data of the captured image to the control device 1001.

The memory 1002 is configured using a primary storage device (for example, a RAM, a ROM), and temporarily stores programs necessary for execution of the operation of the vehicle 708, and further, data or information generated during the operation. The RAM is a work memory used when the control device 1001 operates, for example. The ROM stores a program for controlling the control device 1001 in advance, for example. The memory 1002 may be incorporated in the control device 1001. In addition, the memory 1002 stores information of service provision contents that the vehicle 708 may realize for the journey implementation.

The communication unit 1003 is configured of a communication circuit that communicates with the server 701 through the network 703. Examples of a communication method by the communication unit 1003 include a wired communication method such as WAN, LAN, power line communication, and a wireless communication method such as WiFi (registered trademark) and mobile communication for mobile phone corresponding to the network 703, for example. For example, the communication unit 1003 receives the request information transmitted from the server 701, and transmits, to the server 701, request approval and disapproval information with respect to the request information passed from the control device 1001.

The recording device 1004 is configured using a secondary storage device (for example, an HDD or an SSD) or a tertiary storage device (for example, an optical disk or an SD card). The recording device 1004 stores the journey plan information that the vehicle 708 is requested by the server 701. In addition, the recording device 1004 stores schedule information indicating the reservation status of use of the vehicle 708 for each day (for example, the vacancy information of the vehicle 708 for each month, day, and time zone).

The control device 1001 is configured using a single or a plurality of Electronic Control Units (ECUs), for example. The control device 1001 serves as a control unit of the vehicle 708, and performs control processing for overall control of the operation of each part of the vehicle 708, input and output processing of data with each part of the vehicle 708, arithmetic processing of data, and storage processing of data. The control device 1001 operates in accordance with a program stored in the memory 702.

The control device 1001 at least includes, as functional (software) configurations that may be realized by execution of a program, a request reception unit 1007, a schedule management unit 1008, an arrival time transmission unit 1009, and an autonomous driving control unit 1010.

The request reception unit 1007 acquires the request information transmitted from the server 701, and sends, to the schedule management unit 1008, an instruction to confirm the presence or absence of a reservation for use of the vehicle at the date and time of journey included in the request information. Further, based on the determination result from the schedule management unit 1008, it generates approval and disapproval information indicating whether or not the request from the server 701 may be accepted. Then, the request reception unit 1007 transmits the generated approval and disapproval information to the server 701 through the communication unit 1003. In addition, when accepting the request from the server 701, the request reception unit 1007 transmits a schedule update instruction to the schedule management unit 1008.

The schedule management unit 1008 manages the presence or absence of reservation for use of the vehicle. Based on the schedule information stored in the recording device 1004, the schedule management unit 1008 determines whether or not the vehicle is available at the date and time of journey included in the request information from the server 701 according to the confirmation instruction from the request reception unit 1007. Then, the schedule management unit 1008 passes the determination result to the request reception unit 1007. In addition, the schedule management unit 1008 reads out and updates the schedule information stored in the recording device 1004 based on the date and time designated in the request information from the server 701 by the schedule update instruction from the request reception unit 1007, and stores the updated schedule information in the recording device 1004.

The arrival time transmission unit 1009 estimates a time to pick up a user 706 on the day of journey, generates estimated arrival time information, and transmits the generated estimated arrival time information to the user terminal 705 through the communication unit 1003. The contact information of the user terminal 705 is included in the request information received from the server 701. The vehicle 708 may transmit the estimated arrival time information to the user terminal 705 through the server 701, rather than directly transmitting the estimated arrival time information to the user terminal 705.

The autonomous driving control unit 1010 is a known automatic driving controller in which a control function of automatic driving of the vehicle 708 is implemented. The autonomous driving control unit 1010 determines the traveling of the vehicle 708 as that of an autonomous driving vehicle based on the detection results of the GNSS receiver 1005 and each of the plurality of sensors 1006. For example, the vehicle 708 moves and stops by automatic driving from a departure point of the travel to the shop 72 and from the shop 72 to a return point in accordance with the journey plan designated by the server 701.

<Configuration of Shop Terminal>

Figure 11:
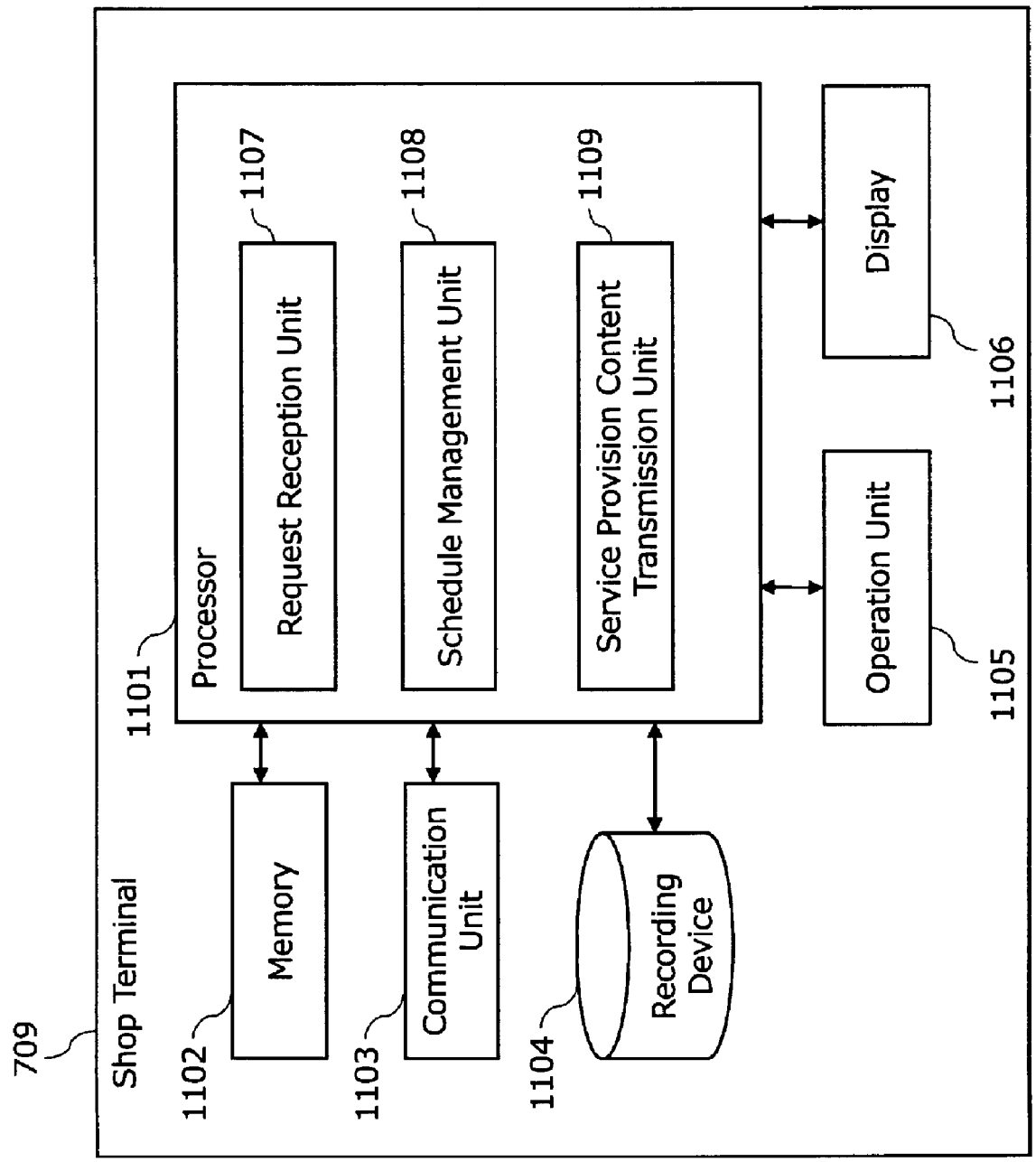
FIG. 11 illustrates a block diagram showing a configuration of the shop terminal shown in FIG. 7.

FIG. 11 is a block diagram showing the configuration of the shop terminal 709 shown in FIG. 7. The shop terminal 709 includes the configuration of a processor 1101, a memory 1102, a communication unit 1103, a recording device 1104, an operation unit 1105, and a display 1106. The shop provider terminal 709 is a terminal used by a shop manager (not shown) that manages a shop providing a service (for example, a restaurant providing a service such as eating and drinking). Further, in the present embodiment, an example in which an application program for realizing the journey service provision system is installed in the shop terminal 709 will be described.

The memory 1102 is configured using a primary storage device (for example, a RAM, a ROM), and temporarily stores programs necessary for execution of the operation of the shop terminal 709, and further, data or information generated during the operation. The RAM is a work memory used when the processor 1101 operates, for example. The ROM stores a program for controlling the processor 1101 in advance, for example. In addition, the memory 1102 stores information of service provision contents that the shop terminal 709 may realize for journey.

The communication unit 1103 is configured of a communication circuit that communicates with the server 701 through the network 703. Examples of a communication method by the communication unit 1103 include a wired communication method such as WAN, LAN, power line communication, and a wireless communication method such as WiFi (registered trademark) and mobile communication for mobile phone corresponding to the network 703, for example. For example, the communication unit 1103 receives the request information transmitted from the server 701, and transmits, to the server 701, request approval and disapproval information with respect to the request information passed from the processor 1101. In addition, the communication unit 1103 may send, to the server 701, the information of the service provision content in the shop terminal 709 passed from the processor 1101.

The recording device 1104 is configured using a secondary storage device (for example, an HDD or an SSD) or a tertiary storage device (for example, an optical disk or an SD card). In addition, the recording device 1104 stores information on service provision contents that may be realized by the shop terminal 709 for journey. In addition, the recording device 1104 stores schedule information indicating the reservation status of use of the shop managed by the shop terminal 709 for each day (for example, the vacancy information of the shop for each month, day, and time zone).

The operation unit 1105 receives an operation of a shop manager (not shown), and passes data or information input by the operation to the processor 1101.

The display 1106 is configured using an organic EL display or a liquid crystal display, for example, and displays data or information passed from the processor 1101.

The processor 1101 is configured using a CPU, a DSP or an FPGA, for example. The processor 1101 serves as a control unit of the shop terminal 709, and performs control processing to collectively manage the operation of each part of the shop terminal 709, input and output processing of data to and from each part of the shop terminal 709, and arithmetic processing of data, and storage processing of data. The processor 1101 operates in accordance with a program stored in the memory 1102.

The processor 1101 at least includes, as functional (software) configurations that may be realized by execution of a program, a request reception unit 1107, a schedule management unit 1108, and a service provision content transmission unit 1109.

The request reception unit 1107 acquires the request information transmitted from the server 701, and transmits to the schedule management unit 1108 an instruction to confirm the presence or absence of a reservation for use of the shop at the date and time of journey included in the request information. Further, based on the determination result from the schedule management unit 1108, it generates approval and disapproval information indicating whether or not the request from the server 701 may be accepted. Then, the request reception unit 1107 transmits the generated approval and disapproval information to the server 701 through the communication unit 1103. In addition, when accepting the request from the server 701, the request reception unit 1107 transmits a schedule update instruction to the schedule management unit 1108.

The schedule management unit 1108 manages the vacancy of reservation for use of the shop. Based on the schedule information stored in the recording device 1104, the schedule management unit 1108 determines whether or not the shop is available at the date and time of journey included in the request information from the server 701 according to the confirmation instruction from the request reception unit 1107. Then, the schedule management unit 1108 passes the determination result to the request reception unit 1107. In addition, the schedule management unit 1108 reads out and updates the schedule information stored in the recording device 1104 based on the date and time designated in the request information from the server 701 by the schedule update instruction from the request reception unit 1107, and stores the updated schedule information in the recording device 1104.

When the request reception unit 1107 accepts the request, the service provision content transmission unit 1109 may send, to the server 701, the information on the service provision content read from the memory 32, such as the service option that may be provided by the shop.

<Server Operation>

Figure 12:
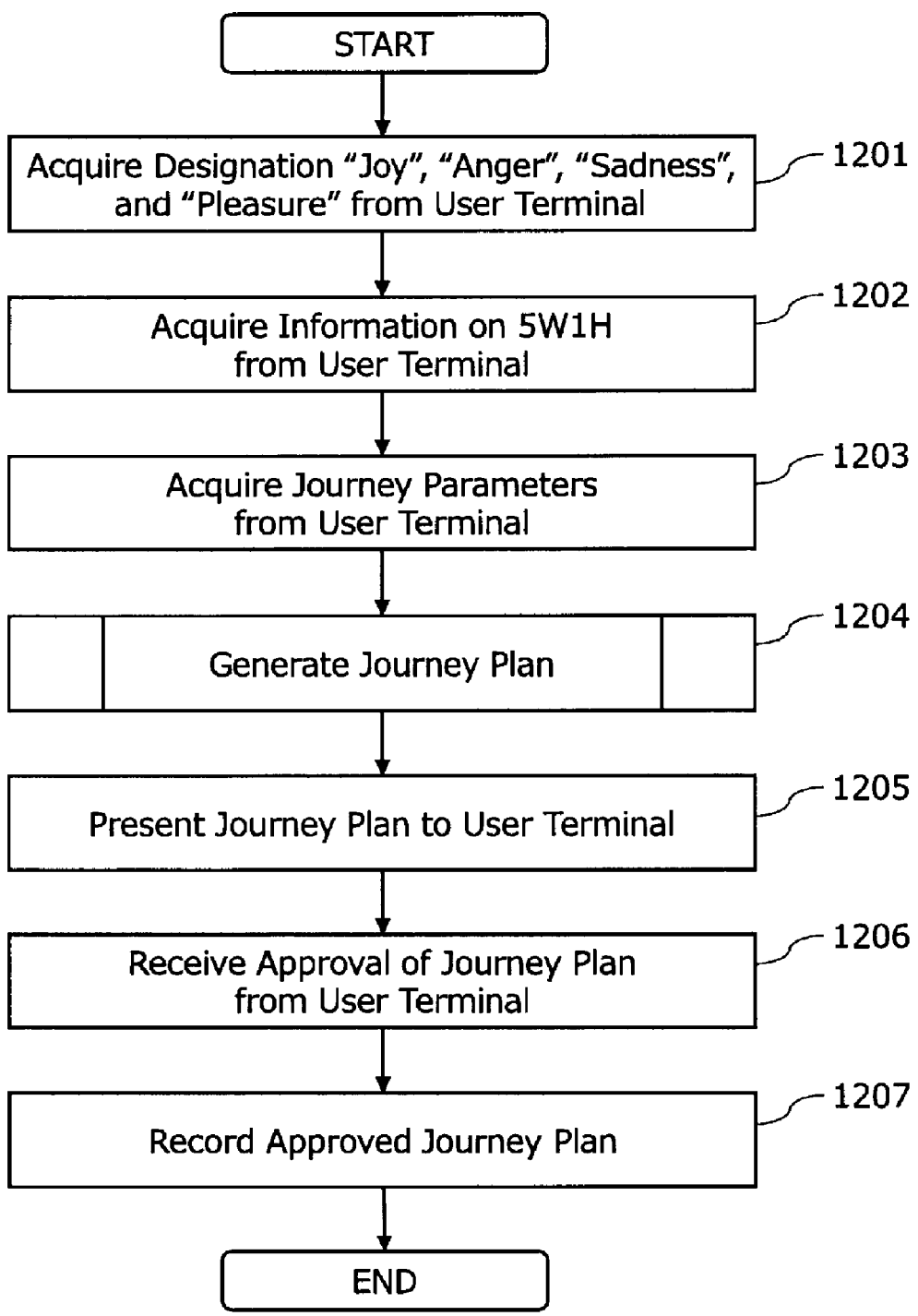
FIG. 12 illustrates a flowchart showing an operation procedure of the server.

Next, an operation procedure example of the server 701 will be described with reference to FIG. 12. FIG. 12 is a flowchart exemplifying an operation procedure of the server 701. In FIG. 12, an example of the operation procedure of the server 701 until the determination of the journey plan of "event reproduction journey" is shown. The processing (steps) shown in FIG. 12 is mainly executed by the processor 801 of the server 701.

In FIG. 12, the processor 801 acquires information on emotions transmitted from the user terminal 705 (step S1201). This information is information for the user 706 to designate an emotion as a theme of the journey. Specifically, type of emotion may be "joy", "anger", "sadness" and "pleasure". The type of emotion may be freely designated using the operation unit 905 of the user terminal 705 by the user 706, or the server 701 may present an option of the type of emotion to the user terminal 705 so as to enable the user 706 to designate the option. When presenting option to the user 706, for example, a User Interface of the experience generation unit 808 of the processor 801 generates display information including option of "joy", "anger", "sadness" and "pleasure", and transmits the generated display information to the user terminal 705 through the communication unit 803. The user terminal 705 displays the display information received from the server 701 through the communication unit 903 on the display 906, and prompts the user 706 to select the type of emotion. Then, based on the input information from the operation unit 506, the registration information generation unit 907 of the user terminal 705 creates information on emotion as registration information, and transmits the information to the server 701 through the communication unit 903.

Next, the processor 801 acquires, from the user terminal 705, information on 5W1H (When, Where, Who, What, Why, and How) with respect to the past experience desired to be reproduced (step S1202).

As an example of the past events and Activities corresponding to each of the types of emotion designated in step S1201, for "joy", "birthday", "marriage", "passing the exam", "shopping", and the like may be mentioned, for "anger", Activity to release stress, such as walking, exercise, shopping", and the like may be mentioned, for "sadness", "pilgrimage", "failure of examination", and the like may be mentioned, and for "pleasure", "museum", "watching baseball", "going out using a Location-based Game", and the like may be mentioned. Then, the user 706 designates information on 5W1H related to these past events and Activities.

For example, as an example of the case where the emotion designated in step S1201 is "joy", it may be mentioned such that "wedding ceremony" as information corresponding to When, "wedding hall" as information corresponding to Where, "user and his wife" as information corresponding to Who, "remembering the wedding" as information corresponding to What, "rediscovery by wedding" as information corresponding to Why, "transporting means such as cars, trains, walks, wheelchairs" as information corresponding to How, respectively.

The information on 5W1H may be freely designated by the user 706 using the operation unit 905 of the user terminal 705, or the server 701 may present an option of the type of emotion to the user terminal 705 so as to enable the user 706 to designate the option. When presenting options to user 706, for example, the User Interface of the experience generation unit 808 of the processor 801 refers to the Activity Theme included in the database of activities 806 to generate display information prompting an input of 5W1H including the option of Activities corresponding to the information on emotions acquired in step S1201, and transmit the generated display information to the user terminal 705 through the communication unit 803. The user terminal 705 displays, on the display 906, the display information received from the server 701 through the communication unit 903, and prompts the user 706 to select and input information related to 5W1H. Then, based on the input information from the display 906, the registration information generation unit 907 of the user terminal 705 creates information on 5W1H as registration information, and transmits the information to the server 701 through the communication unit 903.

Furthermore, the processor 801 acquires journey parameters from the user terminal 705 (step S1203). In this example, the journey parameters are information including desired departure and arrival times, start and end locations, and acceptable tolerances for both, as described above. The registration information generation unit 907 of the user terminal 705 creates the journey parameters as registration information based on the input information from the display 906, and transmits the parameters to the server 701 through the communication unit 903.

The processor 801 generates a journey plan based on the information acquired from the user terminal 705 in steps S1201 to S1203 (step S1204). Specifically, as described above, the Experience Generation Algorithm of the experience generation unit 808 of the processor 801 refers to the database of preferences 805 and the database of activities 806 to generate a journey plan.

Next, the journey plan inquiry unit 810 of the processor 801 generates inquiry information including the journey plan generated in step S1204, and transmits the generated inquiry information to the user terminal 705 through the communication unit 803 (step S1205). At this time, one or more journey plans may be included in the inquiry information.

The user terminal 705 acquires, with the journey plan acquisition unit 908, the inquiry information transmitted from the server 701 and displays the information on the display 906. The journey plan approval unit 909 generates approval and disapproval information based on the information input by the user 706 through the operation unit 905, and transmits the information to the server 701 through the communication unit 903. When a plurality of journey plans are presented from the server 701, the user 706 selects one of them.

When the processor 801 receives the approval and disapproval information through the communication unit 803, the journey plan inquiry unit 810 determines whether or not the approval of the user 706 is obtained from the received approval and disapproval information (step S1206). When the approval of the user 706 is not obtained, the experience generation unit 808 is instructed to re-create a journey plan.

When approval from the user 706 is obtained, the journey plan inquiry unit 810 records the approved journey plan in the recording device 804. As a result, in the server 701, the determination of the journey plan of "event reproduction journey" is completed (step S1207).

Figure 13:
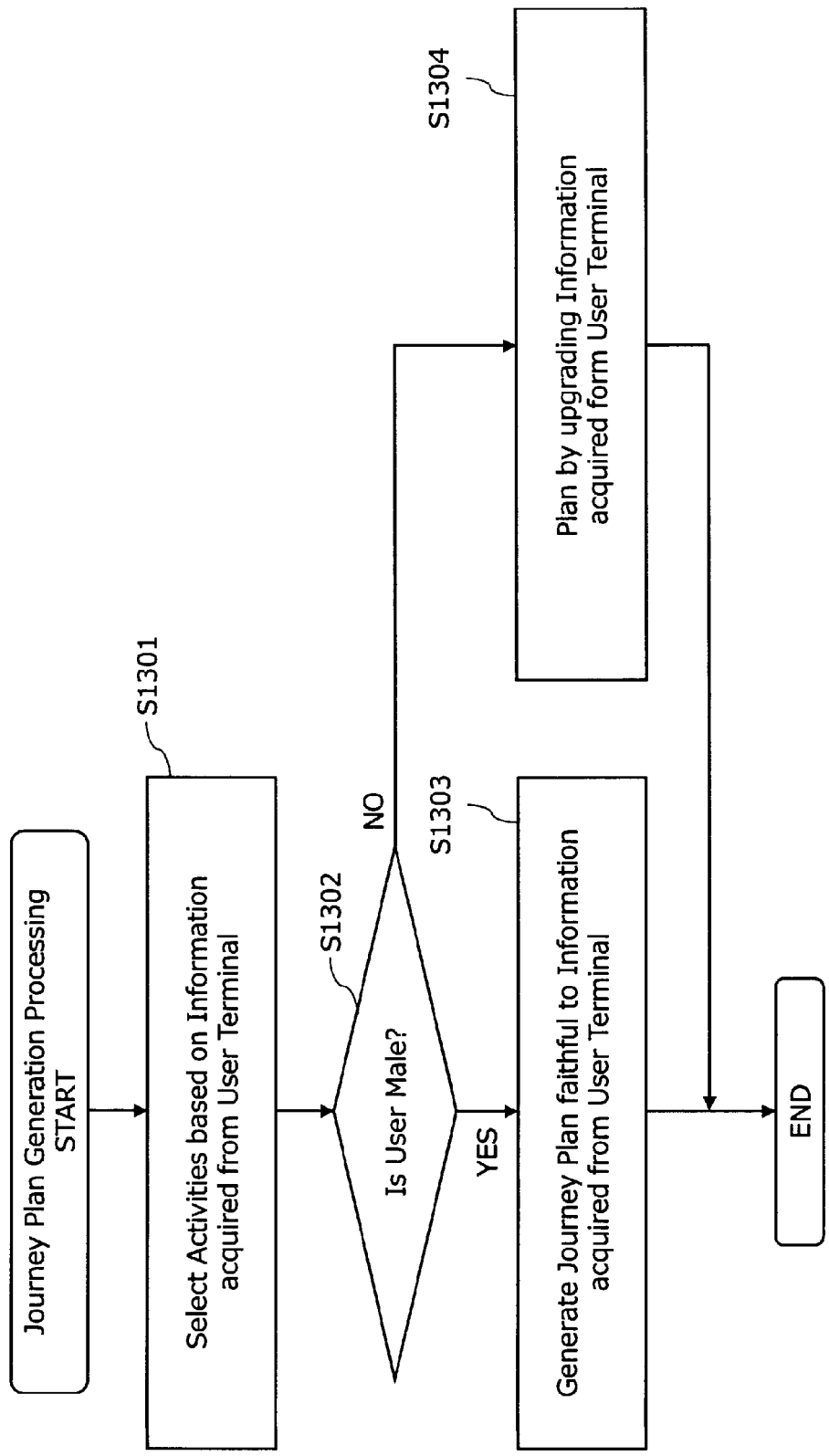
FIG. 13 illustrates a flowchart showing an operation procedure of the journey plan generation processing shown in FIG. 12.

Next, an example of the journey plan generation processing (step S1204) will be described with reference to FIG. 13. FIG. 13 is a flowchart showing the operation procedure of the journey plan generation processing (step S1204) shown in FIG. 12. This example aims to generate a journey plan in consideration of not only the personal preferences of the user but also the tendency for items (attributes) included in the user information.

For example, gender is mentioned as an attribute of the user information. And in this example, it is assumed that male tends to prefer journey plans that faithfully reproduce past experiences, while female tends to prefer journey plans obtained by upgrading the past experiences.

First, based on the information acquired from the user terminal 705 in steps S1201 to S1203, and by referring to the database of preferences 805 and the database of activities 806, the Experience Generation Algorithm of the experience generation unit 808 selects Activities that configure a journey plan (step S1301).

Next, the Experience Generation Algorithm of the experience generation unit 808 refers to the user information recorded in the recording device 804 to determine the gender of the user 706. When the user 706 is male (step S1302: YES), the Experience Generation Algorithm of the experience generation unit 808 generates a journey plan faithful to the information acquired from the user terminal 705 in view of the tendency regarding gender described above (step S1303). On the other hand, when the user 706 is female (step S1302: NO), the Experience Generation Algorithm of the experience generation unit 808 generates a journey plan obtained by upgrading the information acquired from the user terminal 705 (step S1304).

The following two examples may be described as steps S1302 and S1303.

A restaurant is described as a first example. First, in step S1202, the server 701 acquires, from the user terminal 705, information on a restaurant used in the past event. In step S1303, the Experience Generation Algorithm of the experience generation unit 808 determines whether or not the restaurant designated in the information acquired in step S1202 is available. Then, when it is determined that the restaurant is available, the restaurant is incorporated into the journey plan. On the other hand, when it is determined that the restaurant is not available, a similar restaurant (of price range, location, popularity ranking, and the like) is searched and incorporated into the journey plan. In step S1304, the Experience Generation Algorithm of the experience generation unit 808 incorporates, into the journey plan, a restaurant (of price range, location, popularity ranking, and the like) upgraded from the restaurant acquired in step S1202.

As a second example, an item such as a present (in this example, a ring) is described. First, in step S1202, the server 701 acquires, from the user terminal 705, information on an item (ring) appearing in the past event. In step S1303, the Experience Generation Algorithm of the experience generation unit 808 determines whether or not the ring designated at Step S1202 is available for sale. Then, when it is determined that the designated ring is available for sale, the shop in which the ring may be purchased is incorporated into the journey plan. On the other hand, when it is determined that the designated ring is not available for sale, a shop capable of creating the same ring or a similar ring is incorporated into the journey plan. In step S1304, the Experience Generation Algorithm of the experience generation unit 808 incorporates a shop that provides the ring (of price range, material, brand, and the like) upgraded from the ring designated in step S1202 into the journey plan.

In this way, the satisfaction of the user 706 may be improved by presenting the journey plan to the user 706 in consideration of the attributes of the user 706 as well as the preferences of the user 706 and the situation of the town.

Note that the tendency based on the attributes of the user 706 may not necessarily correspond to all the users 706 as an individual. Thus, the tendency based on the user 706 attributes may be adjusted with reference to the database of preferences 805, and may be adjusted based on the attributes of a fellow traveler.

<Operation of the Journey Service Provision System>

Figure 14:
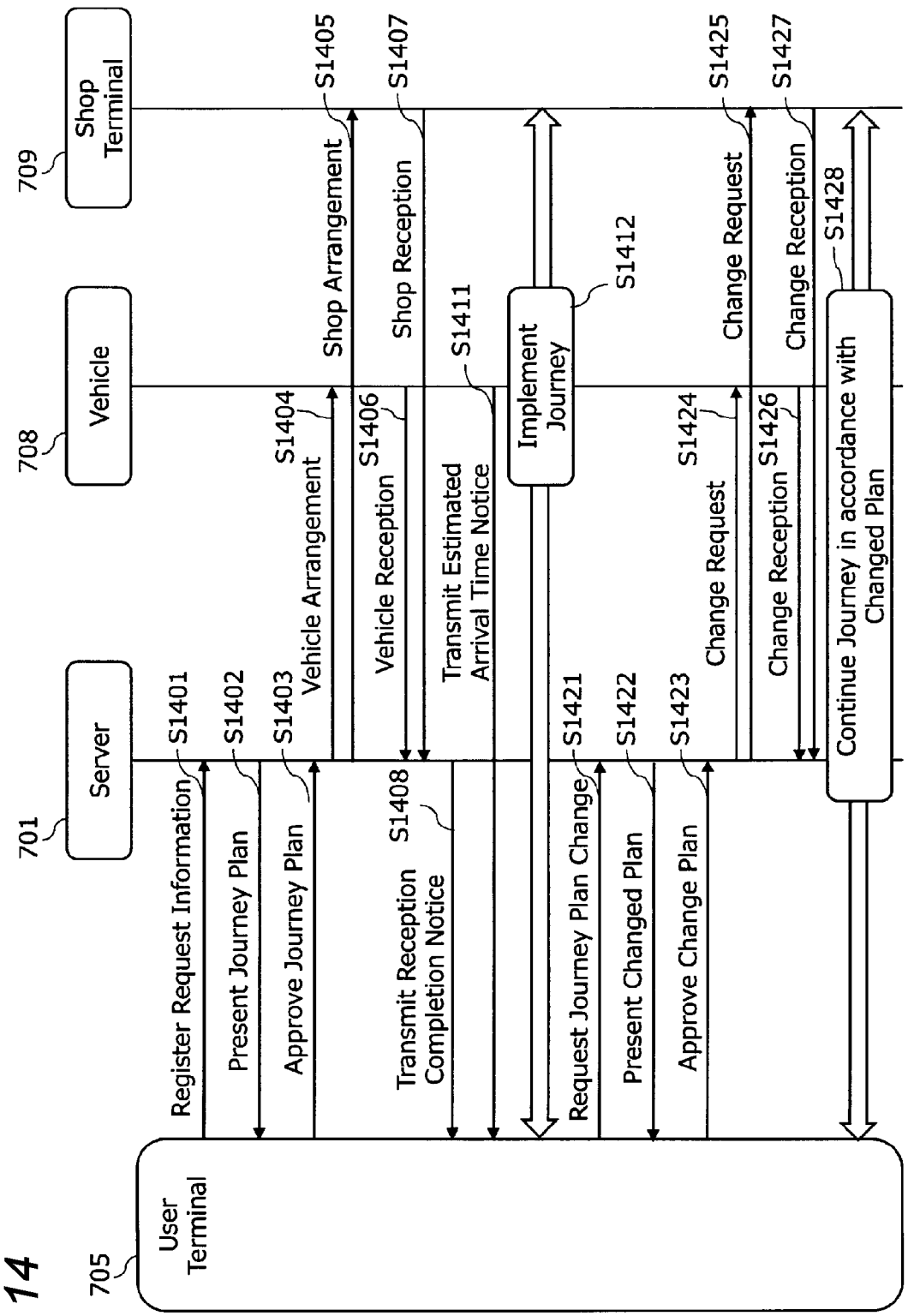
FIG. 14 illustrates a sequence diagram showing an operation procedure of a journey service provision system according to an additional embodiment.

Next, an example of the overall operation procedure of the journey service provision system according to the present embodiment will be described with reference to FIG. 14. FIG. 14 is a sequence diagram showing an operation procedure of the journey service provision system according to an additional embodiment.

In FIG. 14, the user terminal 705 transmits request information to the server 701 in advance (step S1401). This operation is the same as described in detail with reference to steps S1201 to S1203 in FIG. 12. Next, the server 701 generates a journey plan based on the request information received from the user terminal 705, and presents the journey plan to the user terminal 705 (step S1402). This operation is the same as described in detail with reference to steps S1204 to S1205 of FIG. 12 and FIG. 13. Next, the user terminal 705 transmits the approval of the presented journey plan to the server 701 (step S1403). This operation is the same as described in detail with reference to steps S1206 to S1207 in FIG. 12.

Next, upon receiving the approval of the journey plan from the user terminal 705, the server 701 arranges the service provider 707 in order to reserve the service necessary to implement the journey. Specifically, the service provider arrangement unit 811 of the server 701 generates reservation request information based on the approved journey plan recorded in the recording device 804, and transmits the generated reservation request information to the vehicle 708 and the shop terminal 709 through the communication unit 803. As a result, the vehicle and the shop are arranged (steps S1404 and S1405).

The vehicle 708 receives, by the request reception unit 1007 of the control device 1001, the reservation request information from the server 701 through the communication unit 1003, and uses the schedule management unit 1008 to determine whether or not the reservation request may be accepted. Then, the vehicle 708 transmits the approval and disapproval information generated by the request reception unit 1007 to the server 701 through the communication unit 1003. In this example, the case of accepting the reservation request is shown (step S1406).

The shop terminal 709 receives, by the request reception unit 1107 of the control device 1001, the reservation request information from the server 701 through the communication unit 1103, and uses the schedule management unit 1108 to determine whether or not the reservation request may be accepted. Then, the shop terminal 709 transmits the approval and disapproval information generated by the request reception unit 1107 to the server 701 through the communication unit 1103. In this example, the case of accepting the reservation request is shown (step S1407).

The service provision arrangement unit 1015 of the server 701 acquires the approval and disapproval information from the vehicle 708 and the shop terminal 709 through the communication unit 803, and generates journey reception completion information when determining that the approval for the reservation request is obtained. The service provision arrangement unit 1015 transmits the generated journey reception completion information to the user terminal 705 through the communication unit 803. As a result, the server 701 transmits a reception completion notice to the user terminal 705 (step S1408).

On the day of journey, the vehicle 708 transmits estimated arrival time information to the user terminal 705 (step S1411). Then, the vehicle 708 picks up the user 706 at the designated place and travels in accordance with the journey plan designated by the server 701. As a result, journey is implemented (step S1412).

Note that the journey service provision system may also change the determined journey plan during the travel or before the journey is implemented. Here, a case where the user 706 desires to change the journey plan while the journey is being implemented will be described.

When desiring to change the journey plan, the user 706 inputs the desired content of change into the operation unit 905 of the user terminal 705. The registration information generation unit 907 of the processor 901 generates registration information including the change content based on the information input to the operation unit 905, and transmits the registration information to the server 701 through the communication unit 903. As a result, a journey plan change request from the user terminal 705 to the server 701 is performed (step S1421).

When receiving the journey plan change request from the user terminal 705, the server 701 generates a changed plan based on the request information received from the user terminal 705 and presents the changed plan to the user terminal 705 (step S1422). The changed plan may be generated in accordance with the contents designated in the request information, or as described in detail with reference to steps S1204 to S1205 of FIG. 12 and FIG. 13, may be generated in accordance with the preferences of the user, the situation of the town, the attributes of the user, and the like.

Next, the user terminal 705 transmits the approval of the presented changed plan to the server 701 (step S1423). This operation is the same as described in detail with reference to steps S1206 to S1207 in FIG. 12.

When receiving the approval of the changed plan from the user terminal 705, the server 701 performs a change request to the vehicle 708 and the shop terminal 709 (steps S1424 and S1425). Then, when receiving the change request from the server 701, the vehicle 708 and the shop terminal 709 respond to the server 701 as to whether or not the change request is accepted (steps S1426 and S1427). When the vehicle 708 and the shop terminal 709 accept the changed request, the vehicle 708 travels based on the changed plan, and the journey service provision system continues the travel in accordance with the changed plan (step S1428). Note that the operations of steps S1424 to S1427 are the same as the operations of steps S1404 to S1407.

According to the journey service provision system as described above, an optimal journey plan may be presented to the user based on the past emotions and experiences of the user as well as the preferences of the user and the situation of the town, so that satisfaction and motivation to journey of the user may be improved. Further, the user may implement very comfortable journey without feeling the stress caused by the traffic jam in the travel destination or caused by not being able to experience Activities that the user wants to experience.

In addition, by making it possible to receive a change in the journey plan, the journey service provision system may implement flexible journey in accordance with the situation and the desire of the user 706.

<Reuse of Journey Plan after Journey Implementation>

The user 706 may want to travel on the same theme again after implementing the journey. In this case, when receiving a request for generating a journey plan having the same theme from the user terminal 705, the server 701 may change the journey plan to be presented according to the elapsed time from the day the journey has been implemented.

For example, when the elapsed time from the implemented journey date is one year, it is conceivable that the user 706 wants a changed journey plan instead of the same journey plan to renew the memory of the implemented journey. Therefore, when the elapsed time from the last implemented journey date is one year, the experience generation unit 808 of the processor 801 of the server 701 may generate a journey plan in which a similar journey plan recorded in the recording device 804 is partially changed to present to the user terminal 705.

On the other hand, when the elapsed time from the implemented journey date is one year, it is conceivable that the user 706 wants to request the same journey plan again, and thus, when the elapsed time from the last implemented journey date is one year, the experience generation unit 808 of the processor 801 of the server 701 may generate a journey plan same as the previous journey plan recorded in the recording device 804 to present to the user terminal 705.

<Providing Journey Plan Information>

The journey service provision system may disclose, on a website and the like, the information on the journey plan implemented by the user 706 depending on the request of the user 706.

For example, when desiring to disclose each of his and her journey plans, the user 706 inputs the permission to disclose and allowable range of the disclosure through the operation unit 905 of the user terminal 705 (for example, a part of the journey plan that may be disclosed, a restriction of the publicly available users (members)), and the registration information generation unit 907 of the processor 901 generates disclosure permission information according to the input of the operation unit 905. The generated disclosure permission information is transmitted to the server 701 through the communication unit 903. When the server 701 receives the disclosure permission information through the communication unit 803, the journey plan information provision unit 812 links the disclosure permission information with the user information and records the disclosure permission information in the recording device 804. Further, the journey plan information provision unit 812 of the server 701 refers to the recording device 804 and posts the journey plan permitted to be disclosed by the user 706 on the website with respect to the allowable range of the disclosure permitted by the user 706.

The user 706 operates the operation unit 905 of the user terminal 705 when browsing a journey plan of the user himself/herself and other users. The journey plan browsing unit 910 generates a journey plan browsing request according to the input information to the operation unit 905, and transmits the journey plan browsing request to the server 701 through the communication unit 903. When receiving the browsing request through the communication unit 803, the journey plan information provision unit 812 of the server 701 transmits the journey plan browsing information to the user terminal 705 through the communication unit 803.

As a result, this makes it possible to broaden the range of journey plans, such as enabling a child of a user who has implemented the journey to experience a similar journey plan (that is, to reproduce the journey plan of his and her parent) or to experience the same journey plans as celebrity users.

In addition, the journey plan information provision unit 812 of the server 701 may have a function for evaluating a journey plan or a user. For example, a score may be calculated based on an evaluation given by a member user and the like, and the journey plan or the user may be disclosed as journey plan browsing information together with the score. This allows the user 706 to refer to the highly evaluated journey plans and users to plan a journey with higher satisfaction.

Modification Example

Although various embodiments have been described above with reference to the drawings, it goes without saying that the present disclosure is not limited to such examples. It will be apparent to those skilled in the art that, within the scope described in the claims, there may be various kinds of modification examples, modification examples, substitution examples, additional examples, deletion examples, and equivalent examples, and that these belong to the technical scope of the disclosure as a matter of course. In addition, the components in the various embodiments described above may be optionally combined without departing from the spirit of the disclosure.

Although the cases where the application program for realizing the journey service provision system is installed in the user terminal 705, the vehicle 708, and the shop terminal 709 have been described in the embodiments, the present disclosure is not limited to these examples. The user terminal 705 may execute the function of the journey service provision system by accessing the web site of the server 701 and inputting the request items and the like. Further, the service providers 70 such as the vehicle 708 and the shop terminal 709 are not limited to the service providers 70 registered in advance in the server 701, and the server 701 may arrange a reservation and the like through the website of the service provider or a service agent.

Further, the service provider 707 constituting the journey plan is not limited to the vehicle 708 or the shop, and various service providers may be selected.

In accordance with the various embodiments described herein, the features described herein may be implemented using a hardware computer system that executes software programs, and the systems may be implemented using methods. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The various embodiments may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The present application claims the benefit of U.S. Provisional Application No. 62/735,297 filed Sep. 24, 2018, the entire disclosure of which, including the specification, drawings and claims, is expressly incorporated by reference herein in its entirety.

The invention claimed is:

1. A system for generating and transmitting experience journeys, the system comprising:
   a processor; and
   a memory including instructions that, when executed by the processor, cause the processor to perform operations, the operations including:
      receiving a request from a user for an experience journey;
      retrieving a listing of activities within a prescribed vicinity of the user;
      retrieving a listing of user preferences;
      eliminating activities from the listing of activities that are contrary to preferences in the listing of user preferences, thereby forming a listing of preferred available activities;
      devising routes from a user location to activities in the listing of preferred available activities;
      generating experience journeys from the listing of preferred available activities and the devised routes to the activities in the listing of preferred available activities; and
      transmitting the generated experience journeys to the user,
   wherein the request includes journey parameters, the journey parameters including at least one of desired departure and arrival times, starting and ending locations, or acceptable ranges for deviation,
   the generated experience journeys are ranked, and
   metrics on which the generated experience journeys are ranked include at least one of: likely enjoyment of the generated experience journeys, how well the generated experience journeys fit the journey parameters, or how much displacement from a desired arrival position would result from taking the generated experience journeys.

2. The system according to claim 1, wherein the listing of user preferences is retrieved from a database of preferences.

3. The system according to claim 2, wherein the preferences in the listing of user preferences are stored in the database of preferences as binary ratings.

4. The system according to claim 2, wherein the preferences in the listing of user preferences are stored in the database of preferences as a function involving several variables.

5. The system according to claim 2, wherein the database of preferences is populated by at least one of processed smart city feeds or social media.

6. The system according to claim 5, wherein the smart city feeds comprise street cameras, traffic sensors, and footfall sensors.

7. The system according to claim 6, wherein data from the street cameras and the traffic sensors are is processed by computer vision techniques, data from the footfall sensors is processed by numerical counts, and data from the social media is text processed.

8. The system according to claim 1, wherein the listing of activities is retrieved from a database of activities.

9. The system according to claim 8, wherein the database of activities is populated by processed smart city feeds and social media.

10. The system according to claim 9, wherein the smart city feeds comprise street cameras, traffic sensors and footfall sensors.

11. The system according to claim 10, wherein data from the street cameras and the traffic sensors is processed by computer vision techniques, data from the footfall sensors is processed by numerical counts, and data from the social media is text processed.

12. The system according to claim 8, wherein the database of activities includes activity statuses.

13. The system according to claim 12, wherein the activity statuses include metrics that are binary in nature.

14. The system according to claim 1, wherein the operations further include:
   tracking the user location of the user via at least one camera on a vehicle of the user, in order to devise the routes from the user location to the activities in the listing of preferred available activities.

15. The system according to claim 1, wherein the operations further include:
   capturing, via at least one camera, footage of the prescribed vicinity of the user, in order to determine the listing of activities within the prescribed vicinity of the user.

16. The system according to claim 1, wherein the operations further include:
   generating cues, which include content related to activities not associated with a preference in the listing of the user preferences, for a user review;
   monitoring a user reaction to the generated cues; and
   storing user preferences to the activities based upon the monitored reaction to the cues.

17. The system according to claim 16, wherein the generated cues are in a form of at least one of video, audio, or images, and the user preferences are stored in a database of preferences.

18. A method for generating and transmitting experience journeys, the method comprising:
   receiving a request from a user for an experience journey;
   retrieving a listing of activities within a prescribed vicinity of the user;
   retrieving a listing of user preferences;
   eliminating activities from the listing of activities that are contrary to preferences in the listing of user preferences, thereby forming a listing of preferred available activities;
   devising routes from a user location to activities in the listing of preferred available activities;

generating experience journeys from the listing of preferred available activities and the devised routes to the activities in the listing of preferred available activities; and transmitting the generated experience journeys to the user, wherein the request includes journey parameters, the journey parameters including at least one of desired departure and arrival times, starting and ending locations, or acceptable ranges for deviation, the generated experience journeys are ranked, and metrics on which the generated experience journeys are ranked include at least one of: likely enjoyment of the generated experience journeys, how well the generated experience journeys fit the journey parameters, or how much displacement from a desired arrival position would result from taking the generated experience journeys.

19. A non-transitory computer-readable medium including a set of instructions for generating and transmitting experience journeys that, when executed by a computer, causes the computer to perform operations, the operations comprising:

receiving a request from a user for an experience journey;
retrieving a listing of activities within a prescribed vicinity of the user;
retrieving a listing of user preferences;
eliminating activities from the listing of activities that are contrary to preferences in the listing of user preferences, thereby forming a listing of preferred available activities;
devising routes from a user location to activities in the listing of preferred available activities;
generating experience journeys from the listing of preferred available activities and the devised routes to the activities in the listing of preferred available activities; and
transmitting the generated experience journeys to the user, wherein the request includes journey parameters, the journey parameters including at least one of desired departure and arrival times, starting and ending locations, or acceptable ranges for deviation, the generated experience journeys are ranked, and metrics on which the generated experience journeys are ranked include at least one of: likely enjoyment of the generated experience journeys, how well the generated experience journeys fit the journey parameters, or how much displacement from a desired arrival position would result from taking the generated experience journeys.

\* \* \* \* \*